US012647370B2

(12) United States Patent
Bush et al.

(10) Patent No.: US 12,647,370 B2
(45) Date of Patent: Jun. 2, 2026

(54) DISTRIBUTED TIME-SENSITIVE NETWORK (TSN) SCHEDULER

(71) Applicant: Dolby Network Technologies LLC, Wilmington, DE (US)

(72) Inventors: Stephen F. Bush, Niskayuna, NY (US); Prabhu Janakaraj, Niskayuna, NY (US)

(73) Assignee: Dolby Network Technologies LLC, Wilmington, DE (US)

( * ) Notice: Subject to any disclaimer, the term of this patent is extended or adjusted under 35 U.S.C. 154(b) by 0 days.

(21) Appl. No.: 18/668,519

(22) Filed: May 20, 2024

(65) Prior Publication Data

US 2024/0388540 A1     Nov. 21, 2024

Related U.S. Application Data

(60) Provisional application No. 63/503,184, filed on May 19, 2023.

(51) Int. Cl.
H04L 47/28        (2022.01)
H04L 47/2491      (2022.01)

(52) U.S. Cl.
CPC .......... H04L 47/28 (2013.01); H04L 47/2491 (2013.01)

(58) Field of Classification Search
CPC .. H04L 47/28; H04L 47/2491; H04L 47/2416

(Continued)

(56)                References Cited

U.S. PATENT DOCUMENTS

| | | | | |
|---|---|---|---|---|
| 10,862,802 | B1 * | 12/2020 | Subramanian | ...... H04L 12/4645 |
| 2011/0317587 | A1 * | 12/2011 | Lida | ...................... H04L 49/557 |
| | | | | 370/254 |

(Continued)

FOREIGN PATENT DOCUMENTS

WO        WO-2023110052 A1 *   6/2023   ............ H04W 76/15

OTHER PUBLICATIONS

Finn et al., "Deterministic Networking Architecture (RFC 8655)", Oct. 2019, Internet Engineering Task Force (IETF), https://www.rfc-editor.org/rfc/rfc8655.pdf (Year: 2019).*

(Continued)

*Primary Examiner* — Ruolei Zong
(74) *Attorney, Agent, or Firm* — Flaster Greenberg P.C.

(57)              ABSTRACT

A communication network configured to support time-sensitive interconnection communication is disclosed. In one example, the communication network comprises: communication network components, each configured to provide a functionality for data communication from a source device across the communication network to a destination device and a processor arranged to configure at least one component of the communication network components based on a time sensitive communication schedule of a flow which passes through the at least one component, wherein the at least one component is configured to act as at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

20 Claims, 13 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2019/0322299 A1* | 10/2019 | Mong | ................. | B61L 15/0072 |
| 2020/0028791 A1* | 1/2020 | McGrath | .............. | H04L 41/145 |
| 2020/0412813 A1* | 12/2020 | Mong | ................. | B61L 15/0036 |
| 2021/0218686 A1* | 7/2021 | Galeev | ................... | H04L 43/08 |
| 2022/0140930 A1* | 5/2022 | Mehmedagic | ...... | H04L 41/0654 |
| | | | | 370/503 |
| 2023/0336489 A1* | 10/2023 | Varga | ...................... | H04L 45/50 |
| 2023/0379081 A1* | 11/2023 | Sivasiva Ganesan | .... | H04L 1/08 |

OTHER PUBLICATIONS

B. Varga, et al., "Deterministic Networking (DetNet) Data Plane Framework (RFC 8938)", Nov. 2020, Internet Engineering Task Force (IETF), https://www.rfc-editor.org/rfc/rfc8938.pdf (Year: 2020).*
B. Varga, et al., "Deterministic Networking (DetNet) Data Plane: MPLS (RFC 8964)", Jan. 2021, Internet Engineering Task Force (IETF), https://www.rfc-editor.org/rfc/rfc8964.pdf (Year: 2021).*
Ludovic Thomas et al., "Worst-case Delay Bounds in Time-Sensitive Networks with Packet Replication and Elimination", Dec. 2022, IEEE/ACM, IEEE/ACM Transactions on Networking, vol. 30, No. 6, Dec. 2022, https://ieeexplore.ieee.org/stamp/stamp.jsp?arnumber=9801077 (Year: 2022).*

* cited by examiner

| baseAttributes | deviceClass | xilinx_es |
|---|---|---|
| | endStationOrBridge | endStation |
| | transmissionStartDelay | 560 |
| | configFileFormat | json |
| interfaces | logicalPortId | 1 |
| | physicalPortName | ep |
| deviceProgrammingInfo | programmingClass | scp |
| | userLoginName | root |
| | programmingPort | 22 |
| | programmingFilePath | /home/comnets/ tsn-init-scripts/ autoConfig/ parser/data |
| bridgeAttributes | bridgeType | N/A |
| | interPortBridgeDelay | N/A |
| | fabricBandwidth | N/A |
| | cutThroughCapable | N/A |
| tsnAttributes | tsnCapablePorts | ep |
| | tsnCapabilities | AS,As-rev,Qbv |
| | queuesPerPort | 3 |
| | cutThroughEnableQueues | N/A |
| | numBytesLookedAt | N/A |
| AS Attributes | worstCasePtpError | 100 |
| Qbv Attributes | honorsAdminBaseTime | 0 |
| | STQueues | 2 |
| | defaultOpenQueues | 0 |
| | maxGateTimeIntervalDuration | 8000000 |
| | maxCycleTime | 1000000000 |
| | gateControlListSize | 256 |
| | gateOpenDurationAdjustment | 0 |
| | worstCaseQbvError | 100 |
| | queueMaxSDU | DNC |
| | qbvYangModel | ge-qbv |
| CB Attributes | cbDelay | N/A |
| | cbYangModel | N/A |
| Fdb Attributes | fdbYangModel | N/A |

The Following Figure Shows How the MEC System is Deployed in an integrated manner in 5G Network TSN
Domain 2
flows TSN
Domain 1
flows

DISTRIBUTED TIME-SENSITIVE NETWORK (TSN) SCHEDULER

TECHNICAL FIELD

The present description relates generally to integration of a wireless communication system and a time-sensitive network (TSN), and, more particularly, for example, to configuration of a communication network system as a plurality of components of a TSN.

BACKGROUND

Some applications such as industrial automation and manufacturing require ubiquitous and seamless connectivity with strict, deterministic timing requirements for communications between various devices or components (e.g., an industrial controller, a sensor, an actuator, etc.) of the application. To meet such requirements, a TSN system, which provides deterministic communication with relatively stringent quality of service (QOS) parameters, such as latency, jitter and reliability requirements for data traffic, may be integrated with a 5G wireless communication system, which provides a high reliability service, such as an ultra-reliable low latency communication (URLLC) service. The TSN system may include a plurality of configuration modules, and each of the plurality of configuration modules is configured to individually schedule a flow (e.g., TSN flow) in each TSN domain including series of TSN blocks in a system to support time sensitive communication.

SUMMARY

Accordingly, the subject technology provides for an architecture in which a communication network in a system supports time-sensitive interconnection communication between at least two domains (e.g., TSN domains). In one aspect, some implementations include communication network comprises: a plurality of communication network components, each communication network component configured to provide a functionality for data communication from a source device across the communication network to a destination device and a configuration module arranged to configure at least one of the plurality of communication network components based on a time sensitive communication schedule of a flow which passes through the at least one of the plurality of communication network components. In some implementations, the at least one of the plurality of communication network components is configured to at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

In some implementations, the at least one waypoint is an intermediate point along the flow and defines an egress port which the flow passes through so that the flow pass through the at least one of other communication network components in the neighbor communication network. In some implementations, the at least one waypoint includes a null waypoint which identifies a location and a time that Ethernet frames egress through a port corresponding to the null waypoint. In some implementations, the at least one waypoint includes a splitting waypoint which provides splitting functionality to split the flow so that the split flows transmit over multiple egress ports. In some implementations, the at least one waypoint includes a merging waypoint which receives one or more split flows from the at least one of other communication network components in the neighbor communication network. In some implementations, the configuration module generates configuration information for the at least one waypoint, the configuration information including: a stream ID, an ethernet address, cycle time and offset information, a waypoint stream split table, a waypointsplitentry, waypointsplitenabled information, a waypointSplitport, a waypointSplitDirection, a waypointSplitInputIdList, a waypointSplitOutputIdList and Waypoint join. In some implementations, the stream ID identifies the flow, the ethernet address represents address of a flow that egress from a network, the cycle time and offset information represents an offset within a cycle time that frames of the flow transmit through the at least one waypoint and the waypoint join is simply identified by the stream ID and the ingress point to a device in the neighbor communication network. In some implementations, the waypoint stream split table includes: the waypointsplitentry is included in the waypoint stream split table and specifies a port and direction on which an instance of the splitting function is instantiated, the waypointsplitenabled information represent whether the splitting function is enabled, the waypointSplitInputIdList represents a list of stream_handles (tsnStreamIdHandle values) corresponding to flows that are to be split, the waypointSplitOutputIdList represents a list of stream_handles (tsnStreamIdHandle values) corresponding to the flows into which an input packet is to be split, the waypointSplitport represents a port on which the instance of the splitting function is specified by the waypointSplitInputIdList and the waypointSplitOutputIdList and the waypointSplitDirection is a Boolean object indicating whether the instance of the splitting function is to be placed on an out-facing or in-facing side of the port indicated by the waypointSplitport. In some implementations, the at least one of the plurality of other communication network components is configured to as the at least one of other waypoints. In some implementations, the time sensitive interconnection communication includes sending a transmission window offer for transmitting the flow to the least one other waypoint, receiving a transmission window counter offer for transmitting the another flow from the least one waypoint and scoring a sum of a bandwidth of the flow and a bandwidth of the another flow and penalty for jitter and exceeding minimum latency requirements. In some implementations, the transmission window offer includes cycle time and offset information represents an offset within a cycle time that frames of the flow transmit through the at least one waypoint and open duration. In some implementations, the time sensitive communication schedule includes a time sensitive network (TSN) schedule.

In one aspect, some implementations include a system configured to support time sensitive interconnection communication comprising: a first communication network comprising a first scheduler configured to schedule a first flow within a first domain including one or more first communication network components in the first communication network and at least one first waypoint configured to provide the time sensitive interconnection communication, and a second communication network comprising: a second scheduler configured to schedule a second flow within a second domain including one or more second communication network components in the second communication network and at least one second waypoint configured to provide the time sensitive interconnection communication. In some implementations, the at least one first waypoint communicates with the at least one second waypoint to create a composite time sensitive communication schedule such that the first flow passes from the first communication network to the second communication network via the time sensitive interconnection communication.

In some implementations, the at least one first waypoint is an intermediate point along the first flow and defines an egress port through which the first flow passes and the at least one second waypoint is an intermediate point along the second flow and defines an egress port through which the second flow passes. In some implementations, the at least one first waypoint includes a null first waypoint which identifies a location and a time that the frames egress through a port corresponding to the null first waypoint. In some implementations, the at least one first waypoint includes a splitting first waypoint which provides splitting functionality to split the first flow so that the split first flows transmit over multiple egress ports. In some implementations, the at least one first waypoint includes a merging first waypoint which receives one or more split second flows from the at least one second waypoint in the second communication network. In some implementations, configuration information for the at least one first waypoint includes: a stream ID, an ethernet address, cycle time and offset information, a waypoint stream split table, a waypointsplit entry, waypointsplitenabled information, a waypointSplitport, a waypointSplitDirection, a waypointSplitInputIdList, a waypointSplitOutputIdList and a waypoint join. In some implementations, the stream ID identifies the flow, the ethernet address represents address of a flow that egress from a time sensitive communication network, the cycle time and offset information represents an offset within a cycle time that frames of the flow transmit through the at least one waypoint and the waypoint join is simply identified by the stream ID and the ingress point to a device in the neighbor communication network. In some implementations, the waypoint stream split table includes: the waypointsplit entry is included in the waypoint stream split table and specifics a port and direction on which an instance of the splitting function is instantiated, the waypointsplitenabled information represent whether the splitting function is enabled, the waypointSplitInputIdList represents a list of stream_handles (tsnStreamIdHandle values) corresponding to flows that are to be split, the waypointSplitOutputIdList represents a list of stream_handles (tsnStreamIdHandle values) corresponding to the flows into which an input packet is to be split, the waypointSplitport represents a port on which the instance of the splitting function is specified by the waypointSplitInputIdList and the waypointSplitOutputIdList and the waypointSplitDirection is a Boolean object indicating whether the instance of the splitting function is to be placed on an out-facing or in-facing side of the port indicated by the waypointSplitport. In some implementations, time sensitive interconnection communication includes sending a transmission window offer for transmitting the first flow to the least one second waypoint, receiving a transmission window counteroffer for transmitting the second flow from the least one second waypoint and scoring a sum of a bandwidth of the first flow and a bandwidth of the second flow and penalty for jitter and exceeding minimum latency requirements. In some implementations, the transmission window offer includes cycle time and offset information represents an offset within a cycle time that frames of the first flow transmit through the at least one waypoint and open duration. In some implementations, the first communication network and the second communication network are networks compatible with 3GPP standards. In some implementations, the composite time sensitive communication schedule is created based on a time sensitive network (TSN) schedule.

BRIEF DESCRIPTION OF THE DRAWINGS

Certain features of the subject technology are set forth in the appended claims. However, for purpose of explanation, several aspects of the subject technology are set forth in the following figures.

FIG. 5 illustrates an example set of parameters for an example TSN block in accordance with one or more implementations.

DETAILED DESCRIPTION

Figure 1:
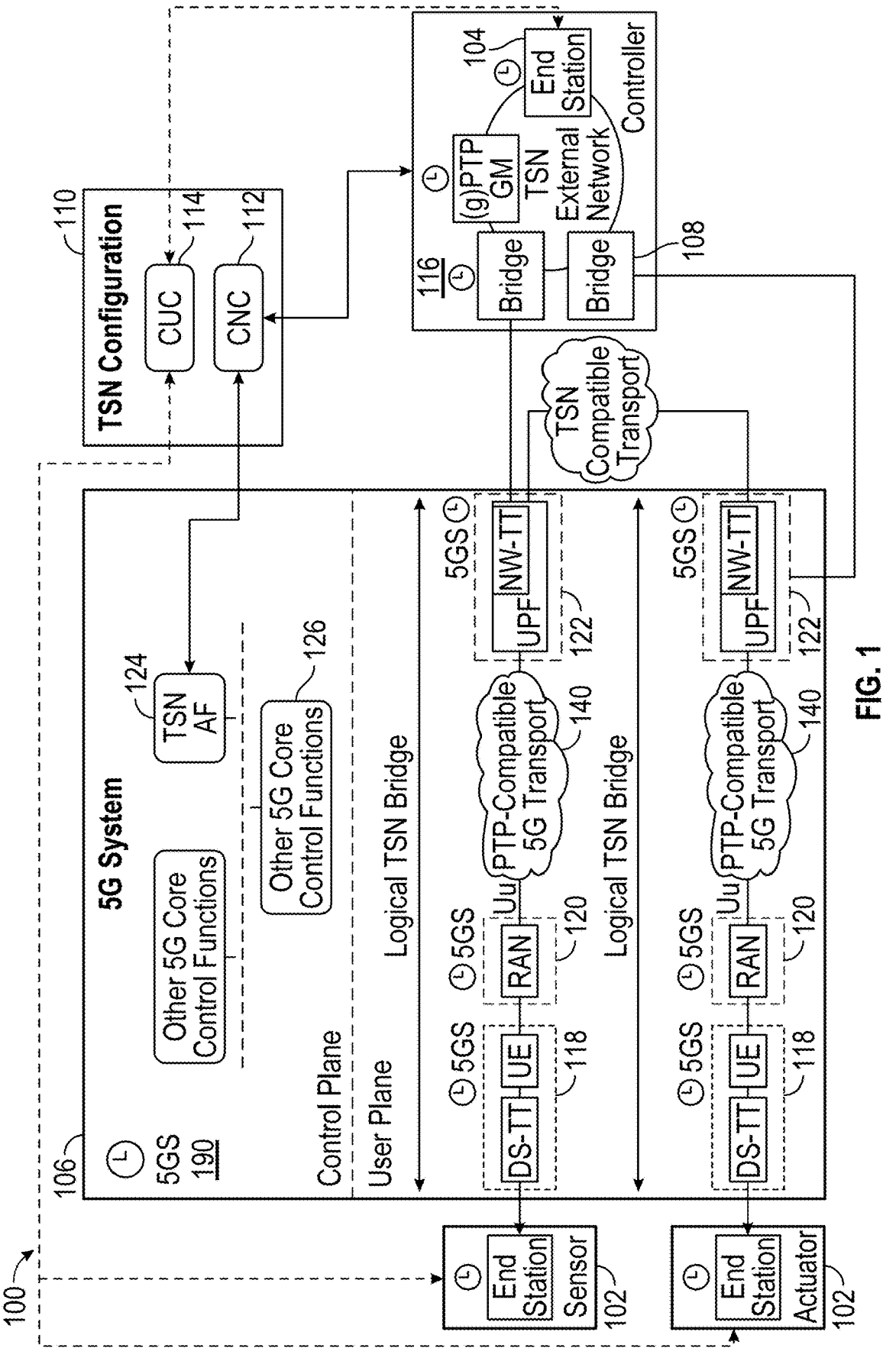
FIG. 1 illustrates an example of a conventional integrated TSN-5G system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, for some applications such as, but not limited to, industrial automation, manufacturing, and aerospace and automotive in-vehicle communications, a TSN system, which provides deterministic communication may be integrated with a communication network (such a wireless network or a network compatible with a 3GPP standard, such as a 5G network or sixth-generation (6G) wireless communication system or any communication network or system defined per a 3GPP standard or IEEE 802.1 standard). However, typically, in such an integrated TSN-5G system, the entire 5G system is configured to operate as one single TSN component (e.g., a TSN bridge), and the integrated system is set up as a fully centralized configuration model, e.g., that uses one centralized TSN configuration controller. Accordingly, such an integrated system may not support flexibility of deploying a 5G system that includes various components provided by different vendors or for a decentralized TSN configuration of the integrated system. Further, a 5G system may support reliable communication by using redundant paths for data transmission. However, with the 5G system being set up as one TSN component in a typical TSN-5G integrated system, the redundant paths are configured across the entire 5G system through all its components (e.g., from user equipment (UE) to user plane function (UPF)). This does not allow for flexibility of setting up redundant data transmission paths for only for a portion of the 5G system, e.g., the 5G system portion (such as an air interface between UE and radio access network (RAN)/ gNodeB) that is more susceptible to data delay and/or errors.

To address the above-discussed issues in an integrated TSN-5G system, the subject technology provides for a novel architecture in which, instead of being configured as a single TSN component or block, the 5G system is configured as a set of discrete 5G components where each 5G component is configured as one discrete TSN block. In other words, the disclosure provides for an architecture in which the 5G system in an integrated TSN-5G system is partitioned into a plurality of TSN blocks, where each TSN block is configured in accordance with TSN specifications (e.g., per IEEE 802.1Q and related standards), e.g., as a TSN bridge, TSN end device, or a combination of two. Further, instead of having a centralized configuration controller to control the TSN-5G system, the subject technology provides for a plurality of distributed configuration modules in the TSN-5G system. The configuration modules may be interconnected in one or more topologies (including mesh, star, tree, or random) and each configuration module may be responsible to communicate with, and configure, one or more TSN blocks.

As is discussed in detail below, each TSN block of the plurality of TSN blocks of the 5G system includes a set of parameters describing the capabilities to support and execute a data flow (e.g., carrying URLLC data traffic) through that TSN block. Further, each TSN block may include at least one configuration interface configured to support interaction of the TSN block with its respective configuration module. The configuration interface may be used to provide the set of parameters of the TSN block to the respective configuration module, and receive from the configuration module configuration data (e.g., transmission schedule, data flow identities, policing rules, etc.) to support one or more data flows through the TSN block. Each TSN block may be configured to execute or operate according to the configuration data (received via the configuration interface) and transmit data for each data flow according to the specifications provided in the configuration data. Lastly, each TSN block may also include a monitoring and diagnostics module configured to monitor run-time behavior of the TSN block and report the behavior either through the configuration interface or via a separate interface of the TSN block.

Each configuration module of the plurality of distributed configuration modules may be either an external utility responsible for configuring one or more TSN blocks or may be configured as a software module within the TSN block that only configures that TSN block. Each configuration module may be configured to determine and provide to TSN blocks controlled by the configuration module configuration data including a TSN schedule for one or more data flows to be transmitted through the TSN blocks. The configuration modules may exchange information with each other using a standardized Application Programming Interface (API). The exchanged information may include information regarding cycles times for the TSN system (e.g., supported admin cycle times (ACTs) including discrete levels of ACT buckets each corresponding to a specific data flow, max/min cycle times), configuration data including transmission schedule (include time offsets/duration/resources for transmission) for one or more TSN blocks, and information to request or respond to requests for resource allocations. In some implementations, one or more of the plurality of configuration modules may be adapted as a "controller" or "controller module," which may include a component configured or adapted to provide instruction, control, operation, or any form of communication for operable components to affect the operation thereof. A controller module may include any known processor, microcontroller, or logic device, including, but not limited to: field programmable gate arrays (FPGA), an application specific integrated circuit (ASIC), a full authority digital engine control (FADEC), an aviation system, a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof.

3GPP Release 8 classifies self-organizing networks (SON) into three main categories: self-configuration, self-optimization, and self-healing. Self-organization is regarded as a mechanism or a process that enables a system or network to change its organization without explicit command during its execution time. Self-configuration is defined as a process of incorporating a new Network Element (NE) into a service requiring minimal human operator intervention where a network element is a manageable logical entity uniting one or more physical devices. In some implementations, a TSN block (discussed below) may be self-configuring and incorporated into a 5G system as a NE with minimum human intervention. This can be accomplished by TSN applications that automatically share their TSN flow (stream) characteristics and latency requirements with the TSN block. The TSN blocks may collaborate to share the flow characteristics and determine feasible TSN schedules. As one embodiment, a TSN transport network may be self-configured using technologies in this disclosure.

In some implementations, the present disclosure provides a communication network, e.g., a wireless network such as a fifth-generation (5G) or sixth-generation (6G) wireless communication system or network (or any communication network or system defined per a 3GPP standard or IEEE 802.1 standard) that is configured to support time-sensitive deterministic communication based on a time-sensitive network (TSN) mechanism. In the context of the present disclosure, any reference to a "communication network," "wireless network," and "communication/wireless network" denotes a network of various components designed, arranged and/or configured for communication of data, signals, or information from a source node or device to a destination node or device across the network, where at least a portion of the communication is completed wirelessly. Accordingly, the various components of such a network may be communicatively interconnected via wireless links or channels and/or via wired links or channels. The various components of the network include modules and channels/links implemented in hardware, software, and in a combination of hardware and software.

The communication network may include a plurality of discrete communication network (CN) components. Each CN component may be configured to provide a discrete functionality for data communication from a source device across the network to a destination device. The communication/wireless network may further include a processor arranged to configure at least one (or each) of the plurality of CN components with a set of TSN parameters of the TSN mechanism. Configured with the set of TSN parameters, the at least one (or each) of the plurality of CN components may support time-sensitive deterministic communication as a TSN block in a TSN network in accordance with the set of TSN parameters. In other words, the at least one (or each) of the plurality of CN components may operate as a typical TSN block in a TSN network.

The plurality of discrete CN components of the 5G network may include a user equipment (UE), a radio access network (RAN), a user plane function (UPF), a control plane function, and transport network channels connecting CN components including a transport network channel connecting the RAN and the UPF. In some implementations, the at least one of the plurality of CN components that is configured with the TSN parameter(s) is the 5G transport network channel connecting the RAN and the UPF.

The communication network may include a configuration module configured to determine the set of TSN parameters for the at least one of the plurality of CN components, the set of TSN parameters including one or more of a TSN stream identification, a transmission schedule, a deadline or delay budget, a filtering configuration, and a redundancy scheme. In some implementations, the configuration module is configured within a session management function (SMF) of a control plane of the communication network compatible with a 3GPP standard.

In some implementations, the present disclosure provides a communication network, e.g., a wireless network such as a 5G network, includes a plurality of configuration modules interconnected in a certain arrangement and configured to provide a unique set of TSN parameters to each of the plurality of CN components such that each of the plurality of CN components supports time-sensitive deterministic communication as a corresponding TSN block in a TSN network in accordance with the respective unique set of TSN parameters. The plurality of configuration modules may be interconnected in a hierarchical arrangement, a mesh arrangement, a star arrangement, a tree arrangement, or a combination thereof.

In some implementations, the present disclosure provides a system including a first communication (such as 5G/6G) network, a second communication (such as a 5G/6G) network, and a TSN transport channel in connection with the first and second communication networks. The first network may include a first plurality of discrete communication network (CN) components, each CN component configured to provide a discrete functionality for data communication via the first network, wherein at least one of the first plurality of CN components is configured to provide time-sensitive deterministic communication in accordance with a first set of TSN parameters. The second network may include a second plurality of discrete CN components, each CN component configured to provide a discrete functionality for data communication via the second network, wherein at least one of the second plurality of CN components is configured to provide time-sensitive deterministic communication in accordance with a second set of TSN parameters. The TSN transport channel may be configured to facilitate time-sensitive deterministic communication of data exchanged between the first network and the second network, in accordance with a third set of TSN parameters. In some implementation, the TSN transport channel is communicatively connected with a first TSN translator of the first wireless network and a second TSN translator of the second wireless network.

In some implementations, the present disclosure provides a system including a first communication (such as 5G/6G) network, a second communication (such as a 5G/6G) network, and a TSN transport channel in connection with the first and second communication networks. The first network may include a first plurality of discrete communication network (CN) components, each CN component configured to provide a discrete functionality for data communication via the first network, wherein at least one of the first plurality of CN components is configured to provide time-sensitive deterministic communication in accordance with a first set of TSN parameters. The second network may include a second plurality of discrete CN components, each CN component configured to provide a discrete functionality for data communication via the second network, wherein at least one of the second plurality of CN components is configured to provide time-sensitive deterministic communication in accordance with a second set of TSN parameters. The TSN transport channel may be configured to facilitate time-sensitive deterministic communication of data exchanged between the first network and the second network, in accordance with a third set of TSN parameters. In some implementation, the TSN transport channel is communicatively connected with a first TSN translator of the first wireless network and a second TSN translator of the second wireless network.

As noted above, each of the plurality of distributed configuration modules is configured to individually schedule a TSN flow in each TSN domain including a series of TSN blocks in the integrated TSN-communication network system. There is no entity that can schedule all TSN flows in the all integrated TSN-communication network systems or connect schedules for all TSN flows. When a neighbor communication network provides a better network environment (e.g., 5G windfarm communication) or a user moves to a different cell, a TSN flow of an individual TSN domain must transit/pass a communication network of the integrated TSN-communication network system in which the individual TSN domain is configured. In this case, TSN flows may require the ability to be extended through other communication networks, which are also TSNs. A "TSN domain" is understood to mean "TSN configuration domain."

To address the above-discussed issues, the subject technology provides for an architecture in which a communication network in an integrated TSN-communication network system supports time-sensitive interconnection communication. The communication network comprises a processor arranged to configure at least one of the plurality of communication network components based on a time sensitive communication schedule of a flow (e.g., TSN flow) which passes through the at least one of the plurality of communication network components. The at least one of the plurality of communication network components is configured to act as at least one waypoint to provide the time sensitive interconnection communication. The at least one waypoint communicates with at least one of the other waypoints in another network integrated with a neighbor communication network to connect the time sensitive communication schedule with another time sensitive communication schedule of another flow passing through the neighbor communication network instead of rescheduling all schedules.

FIG. 1 illustrates a non-limiting example of a conventional integrated TSN-5G system 100 in which a 5G network or system 106 is configured to be emulated as a single TSN component (e.g., a TSN bridge). Overall, the system 100 is configured as a deterministic TSN system to communicate data between end-devices, e.g., input/output (I/O) devices 102 and a controller 104, via the 5G system 106 (emulating as a TSN bridge) and one or more (conventional) TSN bridges 108 and using a TSN controller 110. The system 100 is configured based on standard methods for time synchronization and traffic management, allowing deterministic communication over standard Ethernet networks between end-devices, e.g., the I/O devices 102 and the controller 104. For example, the system 100 may operate in accordance with the IEEE 802.1Q TSN specification suite, which standardizes layer-2 communication for networking protocols providing deterministic communication while sharing the same infrastructure. For example, a number of standards establish various technological paradigms for a TSN system-clock synchronization (802.1AS, generalized Precision Time Protocol (gPTP)), frame preemption (802.3br and 802.1Qbu), scheduled traffic (802.1Qbv), and redundancy management (Frame Replication and Elimination for Reliability (FRER) IEEE 802.1CB). These standards work together at the Ethernet layer-2 to ensure that control and safety functions are executed while meeting their respective deadlines and constraints. As another implementation, similar integrated system may be configured to implement TSN techniques over a wireless local area network (wireless LAN) such as a Wi-Fi network, e.g., based on Wi-Fi 6 and other common wireless LANs.

For example, the 802.1Qbv TSN standard provides scheduled transmissions for safety-critical data frames in a predetermined manner, and is incorporated herein in its entirety. As used herein, "TSN schema" can refer, without limitation, to networks, components, elements, units, nodes, hubs, switches, controls, modules, pathways, data, data frames, traffic, protocols, operations, transmissions, and combinations thereof, that adhere to, are configured for, or are compliant with, one or more of IEEE 802.1 TSN standards. The 802.1Qbv TSN standard addresses the transmission of critical and non-critical data traffic within a TSN. Critical data traffic is guaranteed for delivery at a scheduled time while non-critical data traffic is usually given lower priority. Various traffic classes have been established according to IEEE 802.1Q that are used to prioritize different types of data traffic.

Ethernet frame preemption is defined by the IEEE 802.3br and IEEE 802.1Qbu standards, which can suspend the transmission of a non-critical Ethernet frame, is also beneficial to decrease latency and latency variation of critical traffic. Resource management basics are defined by the TSN configuration models (IEEE 802.1Qcc). Centralized Network Configuration (CNC) 112 can be applied to the network devices (bridges, e.g., the 5G system bridge 106, bridges 108), whereas, Centralized User Configuration (CUC) 114 can be applied to user devices (end stations, e.g., the I/O devices 102), e.g., as specified in IEEE 802.1Qdj

[D1.0, final comment disposition (v1)]. The fully centralized configuration model follows a software-defined networking (SDN) approach. In other words, the CNC 112 and the CUC 114 in the controller 110 provide the control plane instead of distributed protocols. In contrast, distributed control protocols are applied in the fully distributed model, where there may be no CNC or CUC.

High availability, as a result of ultra-reliability, may be provided by Frame Replication and Elimination for Reliability (FRER) (IEEE 802.1CB) for data flows through a per-packet-level reliability mechanism. This provides reliability by transmitting multiple copies of the same data packets over disjoint paths in the network. Per-Stream Filtering and Policing (802.1Qci) improves reliability by protecting against bandwidth violation, malfunctioning and malicious behavior. Further, the time synchronization in the TSN system may be defined by the generalized Precision Time Protocol (gPTP) (802.1AS), which is a profile of the Precision Time Protocol standard (IEEE 1588). The gPTP provides reliable time synchronization, which can be used by other TSN tools, such as Scheduled Traffic (802.1Qbv).

To achieve desired levels of reliability, TSNs employ time synchronization, and time-aware data traffic shaping. The data traffic shaping uses the schedule to control gating of transmissions on the network switches and bridges (e.g., nodes). In some aspects, the schedules for such data traffic in TSNs can be determined prior to operation of the network. In other aspects, the schedules for data traffic can be determined during an initial design phase based on system requirements, and updated as desired. For example, in addition to defining a TSN topology (including communication paths, bandwidth reservations, and various other parameters), a networkwide synchronized time for data transmission can be predefined. Such a plan for data transmission on communication paths of the network is typically referred to as a "communication schedule" or simply "schedule." The schedule for data traffic on a TSN can be determined for a specific data packet over a specific path, at a specific time, for a specific duration. A non-limiting example of a technique for generating schedule for TSN data traffic is discussed in U.S. application Ser. No. 17/100,356, which is incorporated herein in its entirety by reference.

Time-critical communication between end devices or nodes (e.g., the I/O devices 102 and the controller 104) in TSNs includes "TSN flows" also known as "data flows" or simply, "flows." For example, data flows can comprise datagrams, such as data packets or data frames. Each data flow is unidirectional, going from a first originating or source end device (e.g., the I/O device 102) to a second destination end device (e.g., the controller 104) in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a set of data flows between the inter-connected devices or nodes can be defined. For example, the set of data flows can be between the interconnected devices. For the set of data flows, various subsets or permutations of the dataflows can additionally be defined. Further, time-critical communication between end devices or nodes in TSNs includes "TSN streams" or "streams," where each TSN stream may originate at a specific talker node intended to be communicated to one or more listener nodes. As such, each TSN stream may include one or more data flows, where each data flow is between the talker node (where the TSN stream originated) and a listener node.

Both end devices (e.g., 102, 104) and switches (commonly called "bridges" or "switching nodes") (e.g., 106, 108) transmit and receive the data (in one non-limiting example, Ethernet frames) in a data flow based on a predetermined time schedule. The switching nodes and end devices must be time-synchronized to ensure the predetermined time schedule for the data flow is followed correctly throughout the network. For example, in FIG. 1, the clocks 116 represent that the various switching nodes and end devices in the TSN system 100 (including in the 5G system 106) are be time-synchronized with reference to a global clock (grandmaster clock timing). In some other aspects, only the switches can transmit the data based on the predetermined schedule, while the end devices, for example legacy devices, can transmit data in an unscheduled manner.

The data flows within a TSN can be scheduled using a single device (e.g., the controller 110) that assumes fixed, non-changing paths through the network between the talker/listener devices and switching nodes in the network. Alternatively, the data flows can be scheduled using a set of devices or modules. The scheduling devices, whether a single device or a set of devices, can be arranged to define a centralized scheduler. In still other aspects, the scheduler devices can comprise a distributed arrangement. The TSN can also receive non-time sensitive communications, such as rate-constrained communications. In one non-limiting example, the scheduling devices can include an offline scheduling system or module.

TSN traffic may be tagged using a variety of mechanisms, including VLAN tag Ethernet address IP header information, and a combination of VLAN tag Ethernet address and IP header information. Traffic may be identified and tagged anywhere in the system before protocol data unit (PDU) identification is required. A TSN Talker may create multiple TSN flows (streams) with different TSN latency and determinism requirements and may be assigned different paths that meet the requirements. In some implementations of the subject invention, the latency and determinism values may be specified and offered to TSN applications as a limited set of static, discrete values, rather than an offering to accept an unlimited set of continuous values.

In some implementations, the I/O end device 102 may be, in various aspects, a complex mechanical entity such as the production line of a factory, a gas-fired electrical generating plant, avionics data bus on an aircraft, a jet engine on an aircraft amongst a fleet (e.g., two or more aircraft), a digital backbone in an aircraft, an avionics system, mission or flight network, a wind farm, a locomotive, etc. In various implementations, the I/O end device 102 may include any number of end devices, such as sensors, actuators, motors, and software applications. The sensors may include any conventional sensor or transducer, such as a camera that generates video or image data, an x-ray detector, an acoustic pick-up device, a tachometer, a global positioning system receiver, a wireless device that transmits a wireless signal and detects reflections of the wireless signal in order to generate image data, or another device.

Further, the actuators (e.g., devices, equipment, or machinery that move to perform one or more operations of the I/O device 102) can communicate using the TSN system 100. Non-limiting examples of the actuators may include brakes, throttles, robotic devices, medical imaging devices, lights, turbines, etc. The actuators can communicate status data of the actuators to one or more other devices (e.g., other I/O devices 102, the controller 104 via the TSN system 100). The status data may represent a position, state, health, or the like, of the actuator sending the status data. The actuators may receive command data from one or more other devices (e.g., other I/O devices 102, the controller 104) of the TSN system 100. The command data may represent instructions that direct the actuators how or when to move, operate, etc.

In some implementations, the controller 104 can communicate a variety of data between or among the I/O end devices 102 via the TSN 100. For example, the control system 104 can communicate the command data to one or more of the devices 102 or receive data, such as status data or sensor data, from one or more of the devices 102. Accordingly, the controller 104 may be configured to control operations of the I/O devices 102 based on data obtained or generated by, or communicated among the I/O devices 102 to allow for, e.g., automated control of the I/O devices 102 and provide information to operators or users of the I/O devices 102. The controller 104 may define or determine the data flows and data flow characteristics in the TSN system 100.

Referring now to the 5G system 106 within the system 100, the 5G network or system 106 is a wireless communication network or system used to carry TSN traffic between various TSN end devices, e.g., the I/O devices 102 and the controller 104. In some implementations, the 5G system 106 is configured to emulate as one TSN bridge per User Plane Function (UPF) (similar to TSN bridges 108, according to the TSN standards discussed above). The 5G system 106 may be a New Radio (NR) network implemented in accordance with 3GPP 23 and 38 series specifications (which are incorporated herein in their entirety), and integrated into the system 100 in accordance with the 3GPP Release 17 23.501 standard (for example, v17.1.1 and v17.2.0), which is incorporated herein in entirety. As shown, the 5G system 106 may include various communication network (CN) components such as, in the 5G user plane, User Equipment (UE) 118, RAN (gNB) 120, User Plane Function (UPF) 122, and in the 5G control plane, application function (AF) 124, and session management function (SMF) and policy control function (PCF) 126, among other components, as defined in the 3GPP 23.501 standard. In some implementations, the 5G system 106 may be configured to provide an ultra-reliable low latency communication (URLLC) service. The 5G system 106 based on the New Radio (NR) interface includes several functionalities to achieve low latency for selected data flows. NR enables shorter slots in a radio subframe, which benefits low-latency applications. NR also introduces mini-slots, where prioritized transmissions can be started without waiting for slot boundaries, further reducing latency. As part of giving priority and faster radio access to URLLC traffic, NR introduces preemption—where URLLC data transmission can preempt ongoing non-URLLC transmissions. Additionally, NR applies very fast processing, enabling retransmissions even within short latency bounds.

In some implementations, 5G defines extra-robust transmission modes for increased reliability for both data and control radio channels. Reliability is further improved by various techniques, such as multi-antenna transmission based on multiple-input and multiple-output (MIMO) techniques, the use of multiple carriers and packet duplication over independent radio links.

Time synchronization is embedded into the 5G cellular radio systems as an essential part of their operation, which has already been common practice for earlier cellular network generations. The radio network components themselves are also time synchronized, for instance, through the precision time protocol telecom profile, e.g., based on a 5G internal system clock 190. This provides a good basis to provide synchronization for time-critical applications. For URLLC service, the 5G system 106 uses time synchronization for its own operations, as well as the multiple antennas and radio channels that provide reliability. Besides the 5G RAN features, the 5G system 106 may also provide solutions in the core network for Ethernet networking and URLLC. The 5G core network supports native Ethernet protocol data unit (PDU) sessions. 5G assists the establishment of redundant user plane paths through the 5GS, including RAN, the core network, and the transport network. The 5GS also allows for a redundant user plane separately between the RAN and core network nodes, as well as between the UE and the RAN nodes.

As noted above, in the integrated system 100, the 5G system 106 includes one TSN (virtual) bridge per UPF. The 5G system 106 includes TSN Translator (TT) functionality for the adaptation of the 5G system 106 to the TSN domain, both for the user plane and the control plane, hiding the 5G system 106's internal procedures from the TSN bridged network. The 5G system 106 provides TSN bridge ingress and egress port operations through the TT functionality. For instance, the TTs support hold and forward functionality for de-jittering. FIG. 1 illustrates the case when the 5G system 106 connects an end station 102 to a bridged network 108; however, the 5G system 106 may also interconnect bridges 108.

For the 5G system 106 to be integrated into the TSN system 100, requirements of a TSN stream can be fulfilled only when resource management allocates the network resources for each hop along the whole path. In line with TSN configuration (802.1Qcc), this is achieved through interactions between the 5G system 106 and a configuration controller, e.g., a centralized configuration controller 110 (including the CUC 114 and the CNC 112) and/or a set of decentralized controller modules (e.g., as discussed below with respect to FIG. 2). The interface between the 5G system 106 and the CNC allows for the CNC 112 to learn the characteristics of the 5G virtual bridge, and for the 5G system 106 to establish connections with specific parameters based on the information received from the CNC 112. Bounded latency requires deterministic delay from 5G as well as QoS alignment between the TSN and 5G domains. For instance, if a 5G virtual bridge acts as a TSN bridge, then the 5G system 106 emulates time-controlled packet transmission in line with Scheduled Traffic per 802.1Qbv for example. For the 5G control plane, the TT in the AF 124 receives the transmission time information of the TSN traffic classes from the CNC 112. In the 5G user plane, the TT at the UE 118 and the TT at the UPF 122 may regulate the time-based packet transmission accordingly. The different TSN traffic classes may be mapped to different 5G QoS Indicators (5QIs) in the AF 124 and the PCF 126 as part of the QoS alignment between the TSN and 5G domains, and the different 5QIs are treated according to their QoS requirements.

With respect to time synchronization, the 5G system 106 may implement the gPTP of the connected TSN network. The 5G system 106 may act as a virtual gPTP time-aware system and support the forwarding of gPTP time synchronization information between end stations 102 and bridges 108 through the 5G user plane TTs. All of the various 3GPP and TSN standards mentioned in this disclosure are incorporated herein by reference in their entireties.

Figure 2:
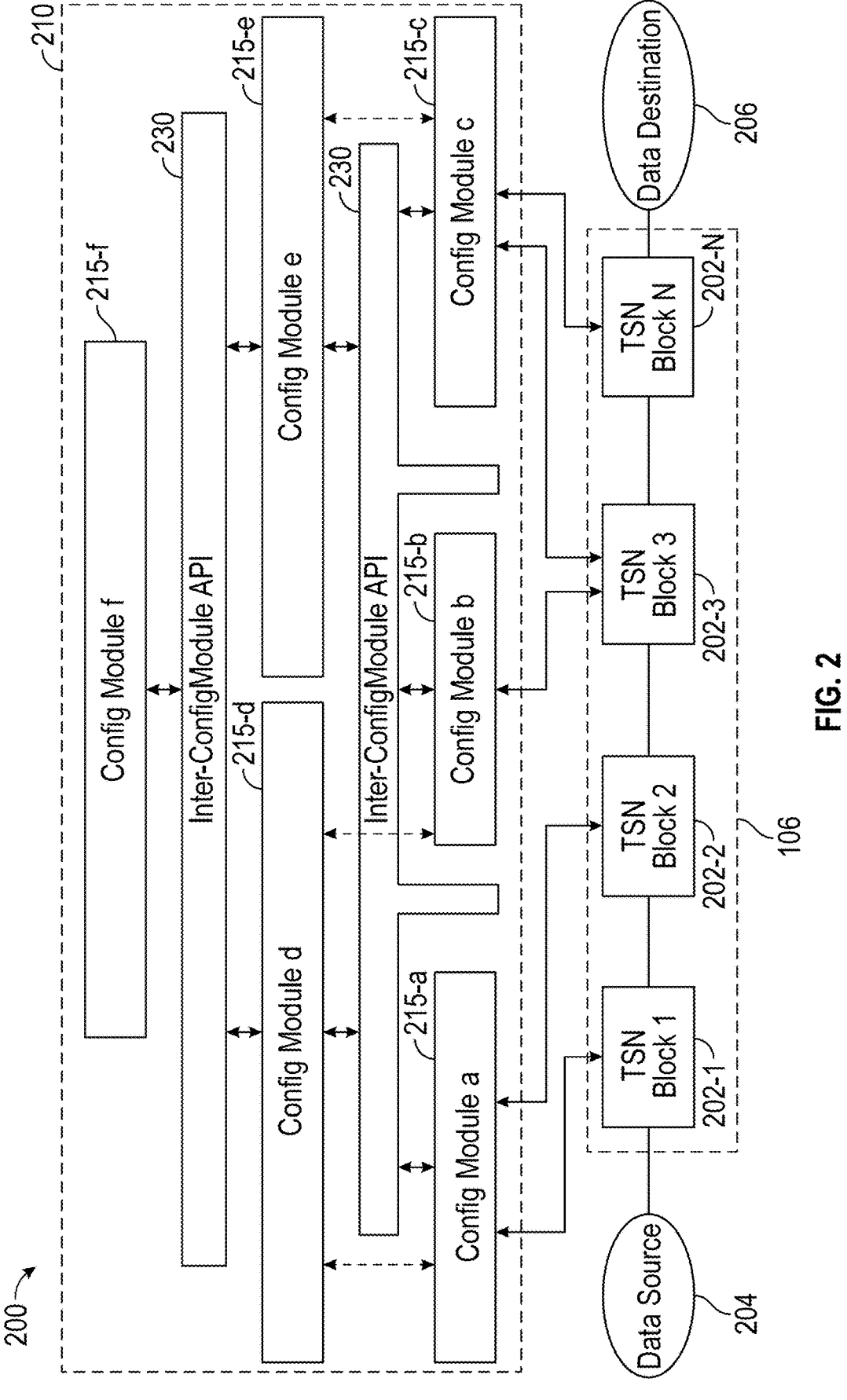
FIG. 2 illustrates a block diagram of an example integrated TSN-5G system architecture in accordance with one or more implementations.

Referring now to FIG. 2, which illustrates a block diagram of a system 200 architecture in accordance with some implementations of the subject technology. Broadly, the system 200 depicts a block diagram of an example implementation of an integrated TSN-5G system similar to the system 100 described above, and also include similar physical components as in the system 100 discussed above. However, unlike the system 100, the system 200 provides a novel architecture for an integrated TSN-5G system in which the 5G system 106 is configured as a set of discrete 5G components where each 5G component is configured to emulate as one discrete TSN block or element 202. In other words, in the system 200, the 5G system 106 is configured as a disaggregated structure including a plurality of TSN blocks 202-1 to 202-N, where each TSN block 202 is configured in accordance with TSN specifications (e.g., per IEEE 802.1 and related standards discussed above), e.g., as a TSN bridge, TSN end device (i.e., as a TSN Talker and/or a TSN Listener), or a combination of two. Further, instead of having a centralized configuration controller 110 to control the TSN-5G system, the subject technology provides for a plurality of distributed configuration modules 215 in a distributed controller 210 in the TSN-5G system 200. The configuration modules 215-a to 215-f may be interconnected in one or more topologies (mesh, star, tree) and each configuration module 215 may be responsible to communicate with and configure one or more TSN blocks 202. In some implementations, one or more of the configuration modules 215-a to 215-f may be implemented within or as part of a function (e.g., SMF 126) of the control plane of the 5G system 106. As used herein, a "topology" can refer to one or more arrangement(s) of a network which can include a plurality of nodes (e.g., sender devices, receiver devices, switches, or bridges) and connecting lines (e.g., communication links, or "hops" including wired communication links or wire-less communication links) between the nodes in the network. Each link can communicatively couple a corresponding pair of nodes. A set of links can be coupled in sequence via their respective nodes to define a link path, for example between an originating node and a destination node. Topologies may comprise, but are not limited to, one or more of mesh, star, bus, ring, and tree topologies.

In some implementations, the system 200 is configured to support and manage deterministic TSN data flows between a data source 204 ("source device") and a data destination device 206 ("destination device") via the 5G system 106 in accordance with TSN configuration including a TSN schedule determined by one or more of the configuration modules 215. The data source 204 and the data destination 206 may include one or more of the I/O devices 102 and the controller 104. Although not shown, the system 200 may also include TSN bridges 108 and other TSN components.

Figure 3:
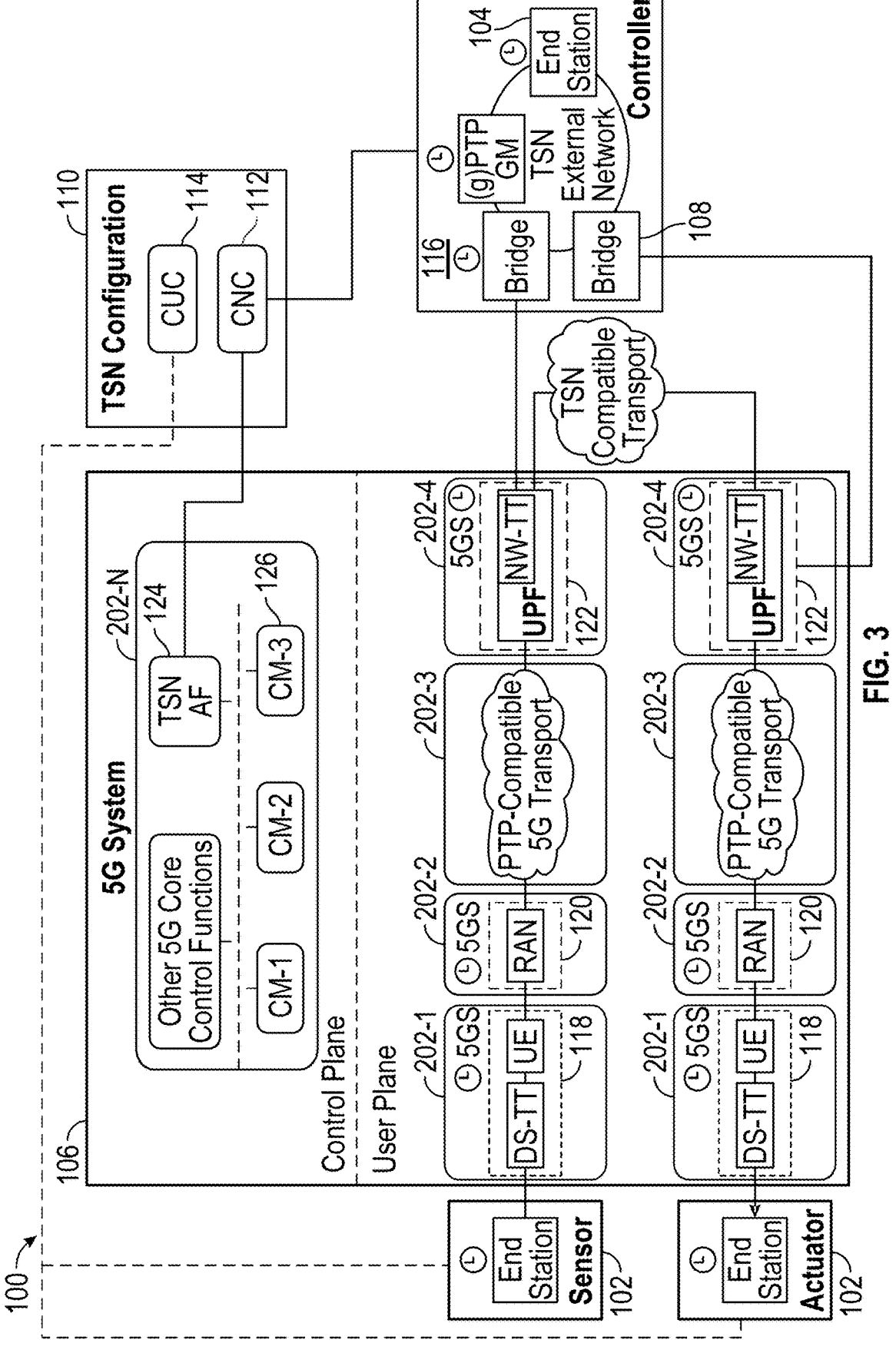
FIG. 3 illustrates an example of an integrated TSN-5G system in accordance with one or more implementations.

In some implementations, in the disaggregated structure, each of the plurality of TSN blocks 202-1 to 202-N may correspond to one specific component of the 5G system, e.g., the 5G network or system 106 shown in FIG. 1 and discussed above. For example, as shown in FIG. 3, the UE 118 may be configured to emulate as the TSN block 202-1, the RAN 120 may be configured to emulate as the TSN block 202-2, the 5G transport network link 140 between the RAN 120 and the UPF 122 may be configured to emulate as the TSN block 202-3, the UPF 122 may be configured to emulate as the TSN block 202-4, and the core network and/or other typical components of a 5G system (e.g., fronthaul, backhaul, Multi-access Edge Computing (MEC) module) may be configured to emulate as one or more TSN blocks 202-N. Each TSN block 202-1 to 202-N is configured in accordance with TSN specifications (e.g., per IEEE 802.1 and related standards discussed above), e.g., as a TSN bridge, TSN end device (TSN Talker and/or TSN Listener), or a combination of two.

Figure 4:
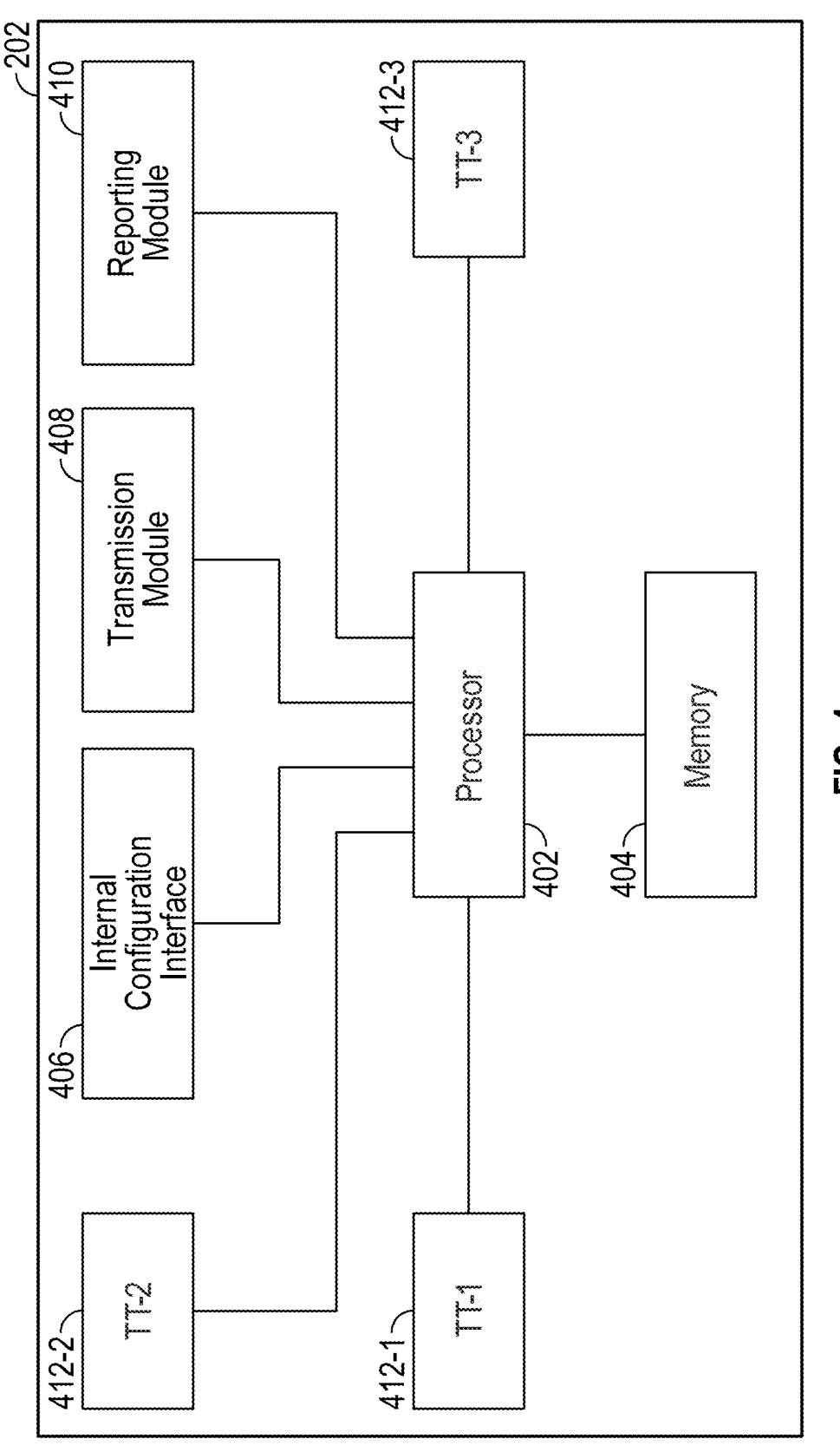
FIG. 4 illustrates a block diagram of an example TSN block in accordance with one or more implementations.

In some implementations, as shown in FIG. 4, each TSN block 202 includes a processor 402, a memory device 404, an internal configuration interface (ICI) 406, a transmission module 408, a reporting module 410, and TSN translators (TT)-1 412-1, TT-2 412-2, and TT-3 412-3. The processor 402 may be a microprocessor or multi-core processor, an integrated circuit, a field programmable gate array, etc. that processes TSN configuration data and executes instructions (stored in memory device 404, for example) to process and transmit TSN data traffic from one or more TSN data flows in accordance with the TSN configuration data.

The memory device 404 may store a set of parameters describing the capabilities to support and execute a data flow (e.g., carrying URLLC data traffic) through the corresponding TSN block 202. In some implementations, the set of parameters include, but are not limited to, identity, link quality, link bandwidth. The identity parameter(s) may include the device type (i.e., whether the TSN block 202 is a TSN bridge or a TSN end station). The latency parameter(s) may include at least port-to-port (start of TSN block to end of TSN block) latency, and latency variation (commonly known as "jitter"). The link quality parameter(s) may include at least packet error rate. The link bandwidth parameter(s) may include at least the available bandwidth in bits per second.

In some implementations, the set of parameters for a TSN block 202 may include a subset of parameters specific to 5G RAN including short transmission-time intervals, Time Sensitive Communication (TSC) assistance information (TS-CAI), configured grant (CG) information, semi-persistent scheduling (SPS) allocation and/or other parameters as specified in, e.g., 3GPP TS 28.540. For example, the TSN block 202 generally supports the time sensitive communication. Further, in some implementations, the set of parameters for a TSN block 202 may include a subset of parameters specific to TSN including time synchronization properties, scheduled transmissions (Qbv) attributes, redundancy attributes including a number of RANs connected to, number of paths to UPF, path diversity, number of available frequencies, propagation characteristics, available radios, different physical media (e.g., free space optics). As an example, FIG. 5 illustrates an example set of parameters 502 for an example TSN block 202.

In some implementations, the set of parameters for a TSN block 202 may define a worst case time synchronization error, a worst case gate operation error, a maximum gate control list size, a maximum cycle time, a maximum gate interval duration, a transmission start delay, the like, or a combination thereof. The set of parameters may include a discrete set of deterministic parameters that may vary by the type of traffic handled by the TSN block 202. The set of parameters may be at least partially utilized to generate a TSN Schedule, configuration, or the like, that is realizable on the hardware of the TSN block 202. In the absence of such set of parameters, a TSN scheduling module has to take a lowest common denominator approach, wherein all devices of the system 200 including TSN blocks 202 are assumed to have the most limiting characteristics resulting in a sub-optimal solution. In this sense, the set of parameters enable better scheduling solution in the TSN system 200 resulting in improved performance metrics including latency, jitter, packet delay variation, and bandwidth utilization.

In some implementations, the set of parameters for a TSN block 202 may further describe or relate to devices created, programmed by, or otherwise of different operation or manufacturer. In this sense, the set of parameters may define a set or subset of disparate devices (e.g. heterogenous, as from multiple vendors), as opposed to homogenous or all-similar devices. For example, the set of parameters may include, but are not limited to, definitions of specific configuration models, error tolerances, hardware limitations, software limitation, and firmware options of each end node and switching node in the system 200. In this sense, the set of parameters enable scheduling and configuration of a heterogenous network comprising of devices from multiple vendors and of varying characteristics.

In some implementations, the set of parameters for a TSN block 202 may further the specific TSN features supported by each end node and switching node in the TSN system 200. For example, the set of parameters may define if a node or TSN block 202 supports one or more of time synchronization, time aware shaping, asynchronous shaping, frame replication and elimination for reliability, frame pre-emption, ingress policing, and other TSN features. The set of parameters may further define the specific version or variant of the feature or standard supported by end nodes and switching nodes in the TSN system 200. These set of parameters enable scheduling and configuration of a mixed capability network wherein end nodes and switching nodes have varying degree of support (including no support) for the desired TSN features and version.

Further non-limiting examples of the set of parameters for a TSN block 202 device may include, but is not limited to, additional parameters utilized for programming functionality of the respective TSN block 202. For example, additional set of parameters may define or enable for the programming of the respective TSN block 202 with a generated or scheduled TSN configuration. Non-limiting examples of the set of parameters may define or enable for the programming of the respective TSN block 202 can include, but are not limited to, a programming method, a communication protocol, a device login name, a device login password, a device programming port, a device programming file structure or file path for programming data, a device programming file format, a device configuration file format, a device schedule file format, the like, or a combination thereof. In this sense, this set or subset of parameters defining or enabling for the programming of the respective TSN block 202 with a generated or scheduled TSN configuration (collectively, "programming parameters") and enable or allow for the system 200 to update, install, program, configure, or otherwise modify the set of TSN blocks 202 to operate in response to, or in accordance with, a schedule or a configuration for the TSN system 200.

Further, each TSN block 202 may include at least one internal configuration interface (ICI) 406 configured to support interaction of the TSN block 202 with, e.g., its respective configuration module 215. The ICI 406 may be used to provide some or all of the set of parameters of the TSN block 202 to the respective configuration module 215, and receive from the configuration module 215 configuration data (e.g., transmission schedule, data flow identities, policing rules, etc.) to support one or more data flows through the TSN block 202. Each TSN block 202 may be configured to execute or operate according to the configuration data (received via the ICI 406) and transmit data for each data flow according to the specifications provided in the configuration data.

In some implementations, the configuration data received via the ICI 406 at a TSN block 202 from its respective configuration module 215 may include stream identification information, transmission schedule or a deadline or delay budget or (for rate-constrained traffic) a data rate, filtering and policing configuration information, redundancy scheme and/or other TSN configuration information.

TSN Talker information may be separated into different frequency components that require different TSN flow latency and determinism requirements. Conversely, TSN flows from different TSN Talkers may be aggregated into a single TSN flow in order to achieve greater capacity and higher channel utilization. Having discrete cycle times in the integrated TSN-5G system may help ensure ease of TSN flow aggregation.

In some implementations, each TSN block 202 may include the transmission module 408 that is configured to send the transmission of the specific data flow as per the schedule, deadline, delay budget, or data rate received in the configuration data from the configuration module 215 via the ICI 406. In one example in which the TSN block 202-1 corresponds to a UE 118 of the 5G system, the transmission module 408 is configured to send the data transmission based on the resource scheduling of the 5G air interface (between the UE 118 and the RAN 120). The resource scheduling of the 5G air interface may be phase aligned with the integrated TSN-5G system's cycle time. The transmission module 408 may assign resource elements of the 5G component corresponding to the TSN block 202 (of which 408 is a part) in such a manner as to be able to meet schedule transmissions for each Qbv stream. For example, instead of using classical 802.1Qbv style gate control, the UE 118 corresponding to the TSN block 202-1 may use a phase offset (in reference to a cycle time) to align the transmission of a TSN data stream with the assigned schedule. In this example, instead of the UE 118 getting this phase offset from the CNC, the UE 118 may get the phase offset as a special command from the RAN 120.

In some implementations, each TSN block 202 may also include a reporting module 410 configured to monitor run-time behavior of the TSN block 202 and report the behavior either through the ICI 406 or via a separate interface of the TSN block 202. This behavior monitoring includes metrics including but not limited to packet drops and missed transmission windows.

Referring back to FIG. 2, the subject technology provides for a plurality of distributed configuration modules 215 in a distributed controller 210 in the TSN-5G system 200. The configuration modules 215-a to 215-f may be interconnected in one or more topologies (mesh, star, tree) and each configuration module (CM) 215 may be responsible to communicate with and configure one or more TSN blocks 202. For example, the CM 215-a may be responsible for and operatively and communicatively connected to the TSN blocks 202-1 and 202-2. The CM 215-b may be responsible for and operatively and communicatively connected to the TSN blocks 202-3. The CM 215-c may be responsible for and operatively and communicatively connected to the TSN blocks 202-3 and 202-N. As such, the TSN block 202-3 may be configured and controlled by both the CM 215-b and the CM 215-c. For example, a portion of functionalities (e.g., with respect to a first type of TSN applications) at the TSN block 202-3 may be configured and controlled by the CM 215-b, and another portion of functionalities (e.g., with respect to a second type of TSN applications) at the TSN block 202-3 may be configured and controlled by the CM 215-c.

In the example shown in FIG. 2, the configuration modules 215 are arranged in a tree structure where the CM 215-f forms the highest level of the tree structure, the CM 215-a, 215-b, and 215-c form the lowest level of the tree structure, and the CM 215-d and 215-e are between the highest and lowest levels of the tree structure. The configuration modules 215, however, are operatively and communicatively connected to each other via an API 230. In some implementations, in a tree structure (e.g., as shown in FIG. 2), the configuration modules 215 may communicate with other configuration modules 215 at an adjacent tree level (one tree level higher or lower). However, in other topologies (e.g., in a mesh or peer-to-peer structure), any two configuration modules 215 in a distributed controller 210 may be operatively connected to and communicate with each other directly.

In some implementations, each configuration module 215 may be either an external utility responsible for configuring one or more corresponding TSN blocks 202 or may be configured as a software module within the TSN block 202. Each configuration module 215 may be configured to determine and provide to TSN blocks 202 controlled by the configuration module 215 configuration data including a TSN schedule for one or more data flows to be transmitted through the TSN blocks 202. The configuration modules 215 may exchange information with each other using a standardized API 230. The exchanged information may include information regarding cycles times for the TSN system (e.g., supported admin cycle times (ACTs) including discrete levels of ACT buckets each corresponding to a specific data flow, max/min cycle times), configuration data including transmission schedule (include time offsets/duration/resources for transmission) for one or more TSN blocks 202, and information to request or respond to requests for resource allocations. In some implementations, one or more of the configuration modules 215 may be configured as the CNC 112 and/or the CUC 114 of the TSN controller 110 discussed above. In some implementations, one or more of the configuration modules 215-a to 215-f may be implemented within or as part of a function (e.g., SMF 126) of the control plane and/or an element or function (e.g., the 5G transport network 202-3) of the user plane of the 5G system 106. For example, the SMF 126 may be configured to support functionalities of the CUC 114 and/or the CNC 112. In some implementations, the 5G transport network 202-3 may be configured to support functionalities of the CNC 112.

In some implementations, each configuration module (CM) 215 receives from the ICI 406 of the TSN block 202 controlled by the CM 215 some or all of the set of parameters (discussed above) of the TSN block 202. The CM 215 also receives, from another entity in the system 200 through the API 230, information on the data flows to be configured through the TSN block 202. In a non-limiting example, the data source 204 and/or the data destination 206 provide requirements for a data flow between the data source 204 and the data destination 206 to the CM 215 either directly or via an intermediary such as a CUC 114. In some implementations, the CM itself may allow users to define the set of data flows to be configured via a user interface. As used herein, the information on the data flows may include or define a set of data flows, data streams, transmission pathways (predetermined or otherwise adapted), or the like, to define the desired TSN communication pathways between the data source 202 and the data destination 206. A set of non-limiting examples of the information on the data flows may include a maximum allowable latencies, data rate, data frame sizes ("payload"), data frame destinations, band allocation gaps, the like, or a combination thereof.

Based at least on the received data flow information and the set of parameters for the TSN block 202, the CM 215 determines a "solution" (or configuration data), wherein the solution would indicate how to handle each data flow through the TSN block 202. This solution may include time aware schedule, policing rules, amongst other things, as discussed in U.S. application Ser. No. 17/100,356, which is incorporated herein in its entirety by reference. The CM 215 may then send this solution or configuration data to the TSN block 202 via the ICI 406. The TSN block 202 may then executes this solution and transmits data for each flow according to its configuration. In some implementations, as an example process to make the distributed CMs 215 compute a solution, at each level of the tree structure of the CMs 215, a same system modulo theory (SMT) solver may be used, wherein the data flows and their requirements are expressed as constraints and a linear programming methodology is used to solve for a feasible solution. The solution from a lower level of the CM tree is input as used resources (represented again by constraints) at the one-level higher on the CM tree. This process is repeated until the top-most level of the CM tree is reached, where a global solution is determined.

In some implementations, different data sources (e.g., the data source 204) and their applications operate at different cycle times or intervals. Relatedly, different data sources and destinations (and their applications) require different levels of time determinism for many data flows therebetween. In a conventional TSN system, a converged cycle time (commonly known as "admin cycle time") is determined that works for all the data flows in the network. However, in some implementations of the subject disclosure, the integrated TSN-5G system may use a set of discrete/quantized cycle times in the network. Each data flow chooses one of the available quantized cycle times to operate on. The scheduling in the TSN-5G system 100 for scheduled transmissions may be based on quantized/discrete set of cycle times. As an example, the integrated TSN-5G system 100 may limit the available stream intervals and therefore the corresponding cycle times to a set of discrete values including, but not limited to, essentially 1, 10, 100, 1000 milliseconds. Similarly, the stream or data flow requirements may be restricted, e.g., jitter (packet delay variation) requirements could be limited to a predetermined set of discrete values including, but not limited to, essentially 1, 10, 100, 1000 microseconds. In some implementation, a different set of discrete values may be used depending on the applications and use cases supported by the integrated TSN-5G system. For example, geographically dispersed system may use discrete cycles times in the order of milliseconds. In yet another example, a system restricted to a local factory may use discrete cycle times in the order of microseconds. The members of this discrete set may be regularly or irregularly spaced or follow other statistical distribution (including but not limited to logarithmic, linear, gaussian) without defaulting to continuous set of cycle times. In another implementation, set of cycle times are standardized in such a manner that all TSN blocks have cycle times that are a product of elements chosen from a small, common set of prime numbers. This ensures that all composite cycle times will be easily computed by the TSN scheduler and results in one common network cycle time.

Each TSN block in the integrated TSN-5G system may support a set (wherein a set includes one or more) of cycle times. The CMs 215 configure the TSN-5G system 106 or

200 to enable scheduled transmission of data flows across TSN blocks 202 operating at different cycle times. In some implementations, the TSN blocks 202 may be required to operate with compatible cycle times, where compatibility implies the cycle times are an integer harmonic of each other. When an application requests an interval that does not directly map to the available set of discrete cycle times across the set of TSN blocks 202 the flow traverses, the CMs 215 may fit to the closest available cycle time. The closest available cycle time would be an integer multiple or integer divisor of the available cycle times. The CMs 215 may exchange the supported quantized/discrete set of cycle time information with each other during the configuration process. In this instance, the subject disclosure allows a disaggregated TSN-5G system to create feasible configuration for a large number of data streams/flows. In the absence of a quantized cycle/interval, the configuration typically requires large computation time and may even prevent the discovery of a feasible solution.

In some instances, each integrated TSN-5G network slice in the 5G system 106 may have a predefined set of supported cycle times and jitter bounds. In some instances, network slices might be more granular than the typical 5G network slice as per 3GPP specification 23.501, which is incorporated herein by reference. In some implementations, the TSN-5G system 106 or 200 may be sliced based on the TSN cycle times. For example, a 5G network supporting multiple critical services may have URLLC slices dedicated to the periodicity of the applications and their streams. For example, services that have applications operating at approximately 1 msec period may have a dedicated slice which operates at 1 msec cycle time. Similarly, services and applications operating at 100 msec period (or interval) may have a dedicated slice in the integrated TSN-5G system that operates at 100 msec cycle time. Such cycle-time slicing improves both the speed of configuration as well as the overall network performance. In some implementations, the TSN block 202 exposes the supported cycle time(s) for a given slice to its respective CM 215 though its ICI 406. The CMs 215 in turn may exchange with each other the supported cycle times for the TSN blocks under their management via inter-config module API 230 in order to create a configuration solution for the sliced TSN-5G system.

In some implementations, the solution or configuration data determined by a CM 215 may include, but is not limited to, a collective or set of configurations, timings, commands, controls, instructions, the like, or a combination thereof, for operating the respective TSN block 202 in accordance with the characteristics (e.g., as defined by the set of parameters) of the TSN block 202. In some aspects, the configuration data may include a specific transmission information for individual or collective (e.g. "global") data frame transmission for one or more respective TSN blocks 202. The transmission information can include temporal information for the transmission of the data frame. In one or more aspects, the configuration data for a data frame can include a transmission start time. For example, the transmission start time can be the time at which the transmission of the data frame from the respective TSN block 202 initiates. In an aspect, the transmission of the data frame can be initiated by a selective opening of a gate of the respective TSN block 202 to transmit the data frame, as a data flow to a destination node (e.g., another TSN block 202). Conversely, the transmission of the data frame can be ceased or prevented by a selective closing of the gate of the respective TSN block 202 to transmit the data frame. The configuration data may also define or assign a specific path or link communicatively coupling the respective TSN block 202 and another node to transmit the data flow thereon. Additionally, the configuration data may define a duration of the transmission of the respective data flow from the respective TSN block 202. In an aspect, the duration of the data flow transmission can be defined by a time period between the selective opening of the gate (i.e., to transmit the data frame) and the selective closing of the gate of the respective node (i.e., to cease transmission of the data frame to the destination node).

In a conventional TSN system, the TSN schedule is expressed as an absolute time offset in a periodic cycle at which a TSN block is instructed to transmit that data. However, that may be too restrictive for a 5G system 106 composed of components from multiple vendors. In some implementations, a deadline-based schedule is determined and provided with the configuration data by a CM 215. The deadline-based schedule may instruct the TSN block 202 to transmit the data of a configured data flow no later than a deadline (which is expressed in terms of absolute time in a periodic cycle). In some implementations, the delay budget based approach would instruct the TSN block to transmit the data frame of a configured data flow within a delay budget. As such, under the delay budget based approach, the TSN block 202 is required to send a data frame arriving at its ingress port within a certain duration to its egress port. Such a scheme would not require every TSN block 202 to be time synchronized. In some implementations in which the TSN block 202 is configured under a rate constraint, the TSN block 202 is configured to transmit the data frames of a given data flow in a manner that the average or peak transmission rate (in bits per second) does not exceed a configured value (per the configuration data from the CM 215).

In some 5G systems, TSN blocks may be a set of shared resources made available by network slicing based on service profiles bounding network latency, periodic cycle including but not limited to delay/budget. In such implementations, two level scheduling may exist where the 5GS TSN-AF may enable configuring the TSN blocks 202 as a shared resource in addition to slice level TSN scheduling. In either case, the configuration attributes such as resource identifier may identify the TSN blocks for the appropriate configuration. As an example, a service provider may have multiple service profiles with specific periodic cycles, and multiple tenants of the service provider may utilize the same TSN blocks as specified by the 5GS TSN-AF configuration and may perform TSN flow aggregation. In some implementations, a service provider may provide a set of non-shared TSN blocks where only a single layer of service profile may exist. Device specific operating/required resource sharing mode may be available to the CNC 112 through TSN-AF.

As an example implementation of the deadline/delay budget approach by a TSN block 202, when a data frame arrives at an ingress port of the TSN block 202, the TSN block 202 would note the arrival time of the data frame using its local clock. The TSN block 202 may then identify the frame as belonging to a configured data flow, and may then start a countdown timer equal to the configured delay budget for that data flow. Using the transmission module 408, the TSN block 202 may prioritize the transmissions of data with least amount of time left. If the timer of a packet expires before it is transmitted, that event is recorded as a missed transmission and be accounted in the monitoring metrics by the recording module 410.

In some implementations, with respect to scheduled transmissions between the TSN block 202-1 (corresponding to the UE 118) and the TSN block 202-2 (corresponding to the RAN 120) may involve "enhanced" allocation (assignment and transmission) of uplink and downlink transmissions between the UE 118 and the RAN 120 in order meet the schedule assigned by the CM 215-a to the TSN block 202-1 corresponding to the UE 118. In some implementations, the CM 215-a may take into account of UE 118 buffer status and radio conditions as reported by RAN 120 when instantiating the TSN schedule and may adjust or report the required change in requested schedule. In some other implementations, the CM 215-a may send a real-time feedback on the radio conditions as received from RAN 120 to a master CM, e.g., the CM 215-d. This feedback loop may support recalculating the TSN schedule to meet the packet delay budget either at this specific TSN block or across the TSN blocks on a given end-to-end path.

In this implementation, the link quality may be monitored and the CM 215-a may continuously adjust the radio resources in the configuration data to meet the transmission schedule. Radio resources may include but not limited to a logical channel, transmission power, and UE specific slot duration. In some implementations, a static assignment of fixed/deterministic uplink and downlink slots for a given UE 118 may be made such that, e.g., all UEs connected to a given RAN slice are given a scheduled transmission slot. 5G native over-the-air scheduling may be used to determine if the transmission from the UE 118 will meet the transmission deadline. If not, the UE 118 may request elevated access to the RAN 120 to achieve the schedule transmission. In some implementations, the scheduling in the 5G system 106 for scheduled transmissions may be based on quantized/discrete set of cycle times, wherein the set includes at least a 100 msec admin cycle time. In accordance with the subject technology, the radio link between the UE (e.g., represented by TSN block 202-1) and RAN (e.g., represented by TSN block 202-2) may be sliced based on the cycle time. In some implementations, the uplink and downlink between TSN block 202-1 and TSN block 202-2 may have radio resources allocated to each network slice based on the cycle time of the slice. For example, a 1 msec cycle time slice would require radio resources (channels, airtime, etc.) capable of delivering data at the 1 msec rate.

In some implementations, 5G resource elements (e.g., frequency and time slots) may be scheduled such that they meet TSN flow latency requirements in addition to "standard" 5G scheduling traffic prioritization requirements. More specifically, 5G timeslots for a TSN flow may be allocated such they transmit the TSN flow's messages at both the proper cycle time offset (phase) and within the time limit (TSN window time) required by the TSN schedule. In this case, the 5G scheduler differs from a "traditional" TSN Ethernet port in that multiple messages may egress simultaneously if transmitted on different frequencies. In some aspects, under the presence of poor RF channel conditions, the 5G system 106 may send multiple copies of a messages over different frequencies in order to increase the probability of meeting the transmission schedule and/or deadline.

To achieve reliable data transmissions in the system 200, redundant flow paths may be implemented. Disaggregated TSN blocks 202 of the 5G system 106 allow handling error (delayed, dropped, or corrupted frames) in a better way. In some implementations, UE 118 may initiate two redundant disjoint PDU Sessions to UPF 122 for redundancy in which case 5GC may configure the NG-RAN for dual connectivity according to 3GPP 38.300. In some other implementations, FRER may be used between some TSN blocks 202, but not others. For example, redundant streams may be implemented over the air interface between the UE 118 (TSN block 202-1) and the RAN 120 (TSN block 202-2) and then combined at the RAN 120, and can be split again over the core network (TSN block 202-3, 202-4), if needed. As shown in FIG. 1, current redundancy requirement according to 3GPP 23.501 is maximally disjoint paths between the UE 118 and the UPF 122. However, in accordance with the subject technology, there is no need to establish redundant disjoint paths across the entire 5G system, and instead may be implemented for only a portion of the 5G system. For example, in case of the over-the-air interface between the UE 118 and the RAN 120, the redundancy requirement may specify that the two paths should be on different frequencies or different MIMO channels or different time slots. In some instances, the subject disclosure allows for flexible use of redundancy including but not limited to more than two data paths, merging and splitting of data flows between TSN blocks, and support of TSN blocks with varying degree of redundancy capabilities.

The concept of partitioning the 5GS into multiple TSN blocks (e.g., as discussed above with respect to FIG. 2) may potentially enhance security if strict scheduling can impede the flow of malicious traffic between said blocks. However, enabling the 5GS to operate as multiple TSN blocks may introduce security vulnerabilities, primarily via configuration. Specifically, TSN users may become aware of internal 5GS details and connectivity that impact other users sharing the same physical and logical infrastructure. This may occur during the required TSN network discovery phase (e.g., via information returned by the link layer discovery protocol (LLDP)). TSN users may also misconfigure either their own or other users' configuration. This may be partially addressed using NETCONF's notion of secure subtrees, where users have a limited view into their own data model subtree. The 5G system may inherently have a notion of isolated network slices, depending, for example, on whether TSN is implemented virtually (via software) or physically (via hardware). The infrastructure provider may have to set limits on what physical and logical capabilities are exposed to each TSN user. This may be done via the 5G network exposure function (NEF). The subject disclosure provides a solution to the security problem by using "virtual TSN blocks." Virtual TSN blocks are internal 5G TSN blocks that contain only the capabilities offered by the user's 5G network slice. In other words, users may only see and can configure the TSN block information that is exposed via the 5G network slice, and no more than that. In this sense, the internal 5G TSN block is the intersection of the set of information contained by the internal TSN block and the 5G network slice offered to the user.

In some implementations, IETF DETNET standards (as provided at IETF: "Deterministic Networking Working Group"-https://datatracker.ietf.org/wg/detnet/about/) may be implemented or integrated into a 5GS to interconnect islands of smaller Ethernets conforming to TSN. The 5GS may utilize DETNET to enable the transport of TSN messages over IP layer 3 (rather than layer 2). Envisioning such a system, techniques discussed in the present disclosure include a 5GS that supports a DETNET edge, relay, and transit nodes interconnecting spatially separated TSN networks, to create a larger, composite TSN over 5G. All of the aspects of an integrated TSN-5G system provided in this disclosure are applicable to (but are not restricted to) the TSN islands of the 5G DETNET, and in particular, the TSN blocks of disaggregated TSN.

DETNET is comprised of the following components: (1) TSN End System: the IEEE conformant end-system that communicates with the DETNET Edge Node (2) DETNET Edge Nodes: process TSN frames into the DETNET (3) DETNET Relay Nodes: (4) DETNET Transit Nodes: provides congestion avoidance for time-sensitive messages. DETNET is routed, rather than bridged, thus, enabling routable TSN messages between TSN LANs. Essential TSN Ethernet frame information is either transported or reconstructed in the transport among LANs. DETNET accomplishes its higher layer functions by adding sublayers: (1) DetNet service sub-layer: provides DetNet service (e.g., service protection), to higher layers in the protocol stack and applications and (2) DetNet transport sub-layer: supports DetNet service in the underlying network (e.g., by providing explicit routes and congestion protection) to DetNet flows and encapsulating the TSN Ethernet frames. DETNET routing incorporates IP headers are modified per standard router behavior, e.g., time-to-live (TTL handling), where TTL specifies the maximum time the routable IP message is allowed to survive, clearly related to the TSN maximum latency requirement.

The DETNET components may reside within any computational element of the 5GS, specifically within the 5G MEC or Core. Thus, in one implementation, the 5GS may be a fully compliant DETNET that interconnects TSN LANs. In order to provide determinism, DETNET may reserve data plane resources for DetNet flows in some or all of the intermediate nodes along the path of the flow. DETNET may provide explicit routes for DetNet flows. DETNET may distribute data from DetNet flow packets over time and/or space to ensure delivery of each packet's data in spite of the loss of a path. Thus, the TSN CNC/DNC and scheduler, as described above, may require interaction with DETNET, specifically the ability to configure flow paths (including redundant flow paths), TTL, and acquire routing latency and jitter. TSN traffic shapers, time-aware shaping, and network calculus may be used to achieve the required level of determinism in the 5G DETNET.

It is also noted that a hybrid 5GS, in which portions are TSN (layer 2) and portions are DETNET (layer 3) may coexist and interoperate. In such cases, the DETNET portion of the network may itself be treated as a TSN block (or blocks) 202, as discussed above n.

Further with respect to caching within the 5GS to minimize latency and increase determinism for TSN applications, the amount of storage, location, and naming of information in the 5GS may be managed in such a manner to enable rapid and shorter proximity access to minimize jitter. Each piece of information may be cryptographically signed to increase its security and access provided through a hash of encrypted signature and the information stored in 5GS components such as the MEC. A cache forwarding unit will track each data request to allow optimal forward, placement, and service of the cached data. The TSN CNC/DNC and scheduler may compute where to position cached information within the network (specifically the 5GS) to maximize access and minimize jitter (packet delay variance) among 5G applications.

Real-time MEC applications typically have well-defined characterizations of their behavior. Cloud (cloud computing) and fog (fog computing) 5G MEC applications may be partitioned into microservices with hard, real-time constraints that are provided to the TSN scheduler. The constraints may be the longest (worst-case) time to complete a call to the service or a clearly defined statistical description as per a network calculus requirements for an arrival or service curve. In some implementations, microservices may be chained together to create a complete MEC application.

By breaking computation down into a series of smaller microservices, each service may be better controlled and managed and able to provide more determinism. Each microservice may be abstracted as an internal TSN block, comprised of deterministic input, output, schedulable operation, and coordination with the 5G-TSN AF. The microservices may reside on the same or spatially distinct processing systems interconnected via TSN-scheduled communication.

Such hard real-time processing may include the 5G MEC and 5G Core functions. Messages ingress and egress from MEC TSN blocks following a deterministic schedule that can be computed by the TSN scheduler. Note that such TSN blocks will be referred to as "computational TSN blocks." Given that messages generated by the MEC and their corresponding size and transmit times may vary depending upon the computational complexity of the MEC processing task, processing load, and application state, the TSN scheduling component can utilize an internal model, such model being a simulation, emulation, or purely analytical or a hybrid of each, of the MEC processor for TSN scheduling purposes (aka a digital twin). The TSN scheduling component can then generate a complete, end-to-end TSN schedule for all messages flowing among the 5G UE, MEC, and 5G Core, and any cloud processing that is required for a real-time application, where 5G Core and cloud processing are similarly modeled by the TSN scheduler. The TSN schedule can dynamically recompute schedules as required to maintain the required determinism for the 5G TSN real-time MEC/cloud application as the effective processing rate, and thus output message transmission time, varies. The TSN scheduler can provide feedback to the application developer (and for management and deployment) regarding the best location (UE, MEC, cloud) for each processing component of a real-time 5G application, considering link speeds, variation, processing capability, available memory, etc. The TSN system may employ a gate-based approach or a rate-control mechanism such as leaky bucket and may use any number of optimization techniques or network calculus to determine feasible schedules. Thus, a complete flow for a TSN application will include not only an end-to-end path through the network for a specific message, but also the complete processing path through all computational TSN blocks (microservices) acting on the information in the message. IEEE 802.1CB redundant paths can be configured through either redundant or parallel computational TSN blocks (microservices). One should be able to visualize the complete real-time processing activity encoded in the TSN schedule in this invention, where computational TSN blocks appear as Ethernet bridges with the difference that they either process messages or can create new messages that egress on a deterministic schedule.

MEC applications are configured to use TSN flows (to participate as TSN Talkers or Listeners) using NETCONF, RESTCONF, or a RESTful API. Messages defined in the aforementioned protocols contain IEEE 802.1Qcc information required to configure the TSN flows used by MEC applications. Additionally, a MEC application is designed to move from one MEC platform to another and a RESTful API is defined to query the current platform's TSN configuration to verify that it has the required deterministic communication requirements, specifically including latency and jitter. It also has a RESTful API containing the aforementioned information required to notify the TSN CNC of its new location and required information to dynamically reschedule TSN traffic to its new location. As mentioned, IEEE 802.1CB may be used to establish redundant TSN flows to anticipated locations the MEC application may migrate. The TSN scheduler, i.e., the Centralized Network Configurator (CNC) or Distributed Network Configurator (DNC), may be a MEC application offering 5G TSN scheduling-as-a-service and configuration-as-a-service, useful for dynamic rescheduling, where low latency is required.

A TSN application may transmit a timing performance profile-query microservice request with the goal of determining statistical information regarding processing time. When responding to such a request, the microservice will execute the request and return both the result and a timing performance profile. The timing performance profile may contain at least the network start and end time of the microservice call, and may optionally contain the start-time and end-time of all called subfunctions. The information may also contain an average of the MEC processor load during the timing performance profile. The timing performance profile may be used by the TSN application to refine TSN scheduling where microservices are required to process TSN traffic flow. The timing performance profile may be obtained during live operation, where output from the profile is used normally, or as a special test sample prior to live operation. The timing performance profile information may be used to determine which MEC hardware to employ for current and future operations and as constraint information for the TSN scheduler.

The subject disclosure also provides additional new aspects including: (1) TSN-scheduled 5G core functions; (2) Ensuring the CPU has direct time synchronization with the Ethernet hardware timestamping mechanism; (3) Enabling TSN scheduling of specific 5G network function and processes; (4) Adding new time-aware programming features e.g., time-based event processing; (5) Integrating conditional processing based upon time, e.g., real-time programming implemented via YANG configuration of microservice scheduling to implement service chaining (see https://www.rfc-editor.org/rfc/pdfrfc/rfc7758.txt.pdf for example of YANG scheduled operation).

Further, a LinkDelayStatistic (implemented as a YANG model) cumulative distribution function data model may be implemented within the TSN-5G system 106 or 200. In such an implementation, wireless links may collect and feed information to the CNC's scheduler which would then utilize it for scheduling variable speed links. The LinkDelayStatistic YANG model may also provide information regarding whether the link delay is stationary and ergodic. The scheduler may use this information to rely on a given sample to predict the future and create an accurate schedule. The CNC may then utilize this knowledge for each TSN block to deploy the best possible TSN traffic shaping or gate schedule, including the use of network calculus in determining the result.

The subject disclosure also envisions a virtualized network function (VNF-TSN), capable of residing as software within the 5G system. It may require specialized processor hardware to support real-time operation. In some implementations, TSN may be provided as software-defined TSN (SDN-TSN) and 5G TSN-as-a-service (TaaS). In some implementations, VNF-TSN may be configured within every 5G sub-component (TSN block): UE, Radiohead, CU/DU, RAN, MEC, Core, etc. As discussed above, microservices may be chained together as part of TSN scheduling. Each microservice can expose its service time characterization to the TSN schedule. The service is part of the delay, but it may have more variance than a communication link. In such an implementation, the service is the link in this integration of microservices with TSN scheduling. Network calculus may be used to incorporate processing delay. TSN input provides a clear arrival curve. Processor execution time provides a service curve (we assume 5G equipment has a well-characterized processing time).

In another aspect of the subject disclosure, a time-aware MEC platform is defined to be a platform that acts as a PTP client (conformant to 802.1AS End Station) and if needed a PTP bridge (conformant to 802.1AS Bridge). A PTP bridge along with a network bridge functionality is needed for a virtualized MEC platform that runs multiple slices (OSes, VMs, containers) in parallel. Typically, a virtual bridge/switch is used in virtualized compute platforms. In this disclosure, a TSN-enabled virtual switch is defined, which includes Time awareness. The Time aware PTP client in a MEC platform runs a PTP state machine along with a servo to synchronize the locally available clock with grandmaster clock in the network. Furthermore, the MEC platform synchronizes the system clock to PTP clock, wherein system includes operating system, network stack, application stack or any other software and hardware elements that utilize a clock. This enables each MEC application to operate on the synchronized PTP time. In one example, MEC host operates this PTP client and provides all MEC applications with the synchronized time via the virtualization infrastructure (say as system/host time). In another instance, every MEC application may run an individual instance of PTP client connected to the host via a time aware bridge.

As a configuration interface, 3GPP 23.501 specifies a centralized configuration model in which a CNC configures the 5GS as a time aware bridge. Similarly, a MEC platform should be configurable with a CNC as a time aware end station or a time aware bridge. This MEC may support configuration using 802.1Qcw yang models for TSN features including time aware shaping, forwarding, and frame replication and elimination for redundancy. Furthermore, the MEC host may have a CUC component that provides the data flow requirements of the resident applications to a CNC using the 802.1Qcc interface. MEC may also provide the information about its TSN capabilities to the CNC so that CNC can model the MEC accurately. For example, a MEC can present itself as a TSN end station originating a certain set of data flows. The CNC will model MEC appropriately in the network and generate the correct configurations. The MEC shall support identification of data streams in collaboration with the OS and applications. The specific functionality varies depending on the TSN awareness of MEC components. TSN unaware applications on a MEC host requires a IP stream identification in a MEC bridge.

TSN fronthaul/backhaul (e.g., TSN block 202) may connect directly to the MEC, providing deterministic input to the MEC. However, MEC applications are meant to continuously migrate, or perhaps more intuitively "float," to the edge of the 5G network to remain closest to their potentially mobile clients. Thus, MEC applications that require determinism will specify a minimum acceptable packet delay variance (MPDV) threshold. A MPDV may be incorporated into the specification of all MEC applications, which may limit feasible application locations to those MEC platforms that exist as TSN blocks within the 5GS. The application must ensure that the proper TSN stream identification and translation rules are implemented on the new MEC platform (which may be a single processor or a subnetwork of processors) such that the MEC Talker/Listener message frames are properly tagged and handled. MEC applications may want to carry their own configuration instructions when possible in order to "self-install" as they migrate to new MEC platforms. It is noted that a load balancing mechanism may be employed to ensure users do not overwhelm any set of MEC applications and MEC applications are distributed in an optimal manner. In other scenarios, redundant MEC platforms and applications may be instantiated and/or MEC applications migrate due to noise, rather than due strictly to mobility. Multiple MECs may also be connected as TSN redundant systems.

Figures 6A, 6B:
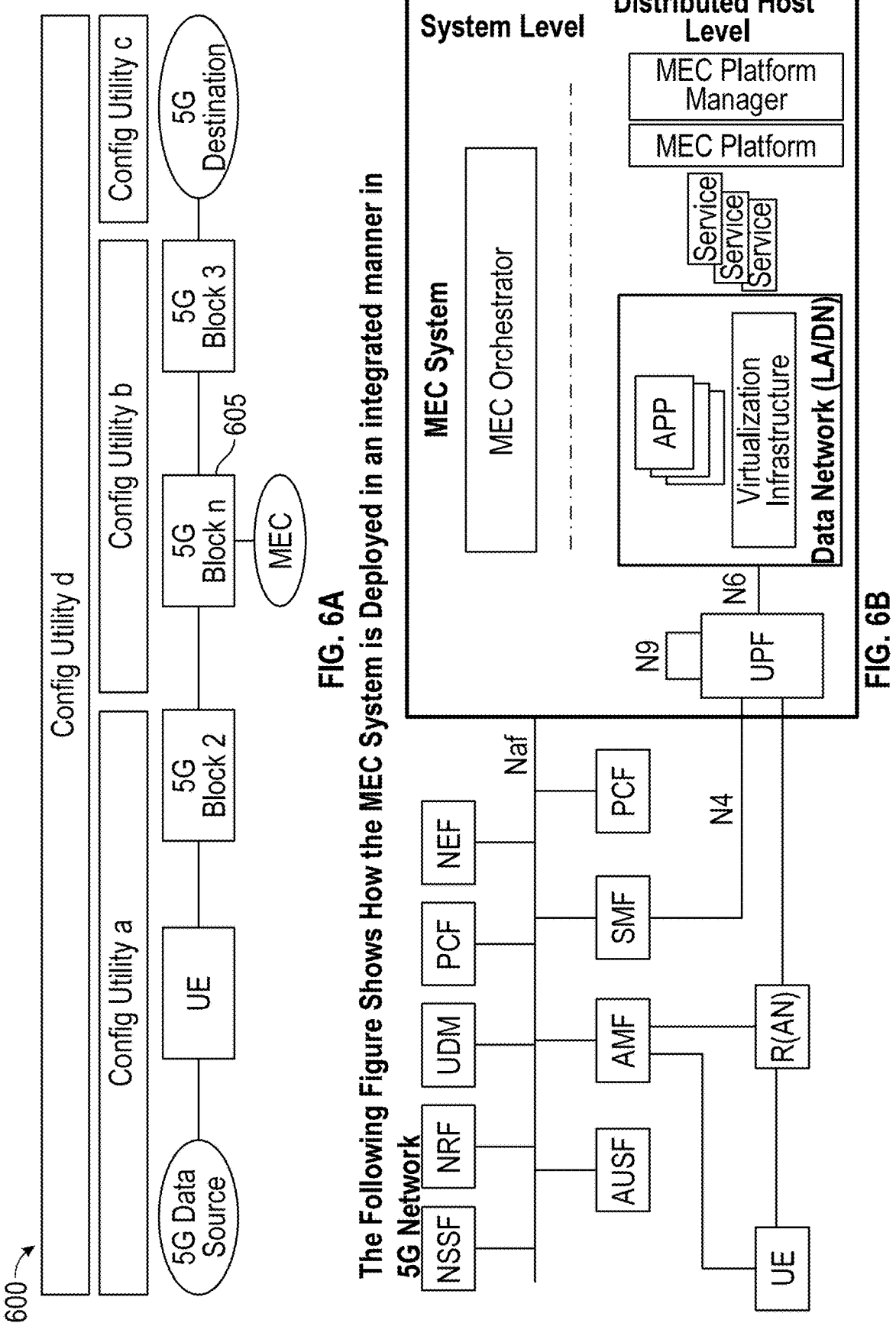
FIGS. 6A, 6B illustrate a block diagram of an example integrated TSN-5G system architecture including MEC in accordance with one or more implementations.

FIGS. 6A and 6B illustrate an integrated TSN-5G system 600 (similar to the system 200) including a TSN block 605 (similar to the TSN block 202-N) representing or corresponding to a Multi-access Edge Computing (MEC) module. The TSN block 605 is configured as a data source/sink (i.e., as a TSN end station), but is located within the 5G system 106 as opposed to arranged at the edge of 5G system 106. The TSN block 605 may be configured as a bridged end station.

Figure 8:
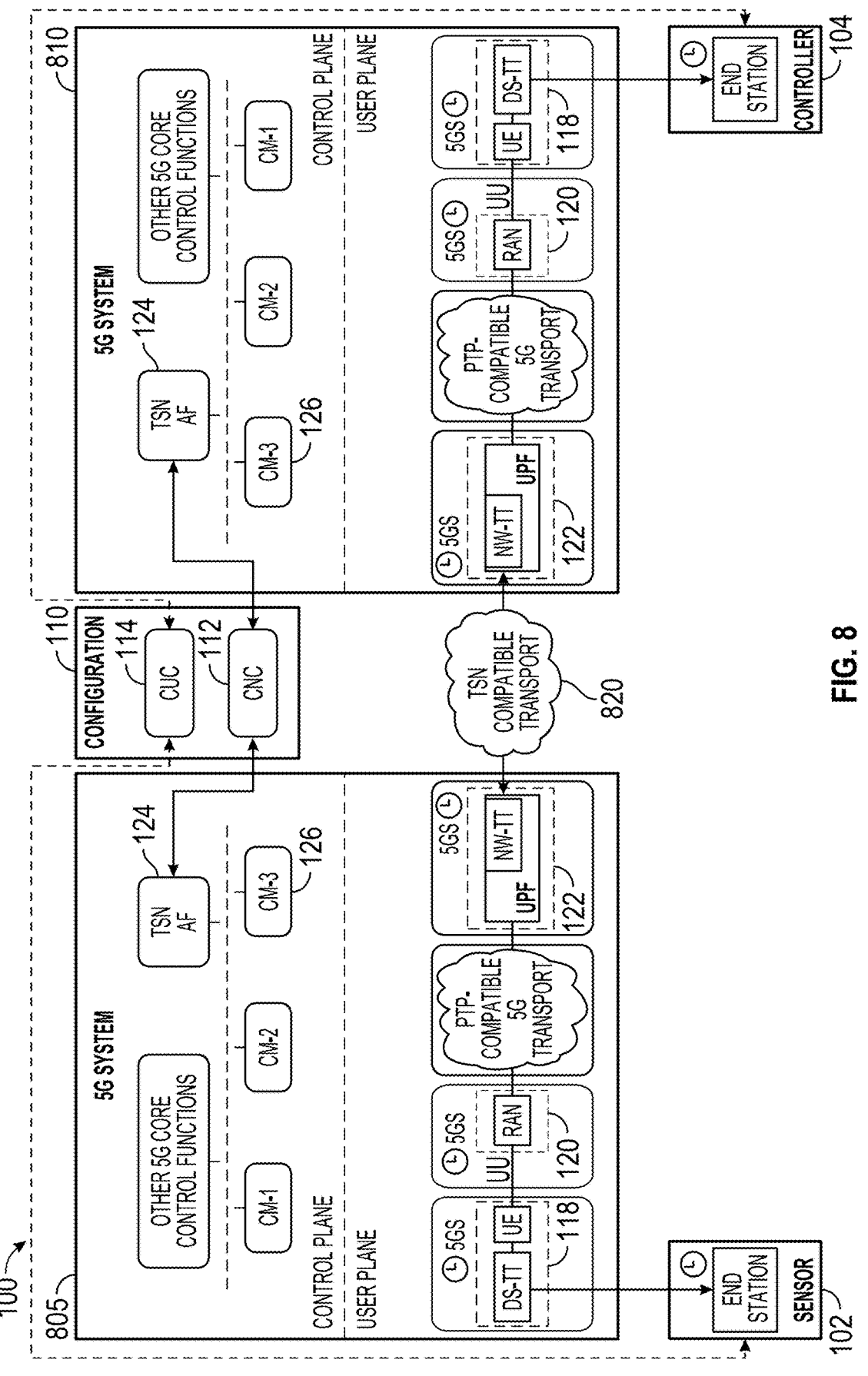
FIG. 8 illustrates a block diagram of an example integrated TSN-5G system architecture in accordance with one or more implementations.

Referring to FIG. 8, an application data stream may span multiple integrated TSN-5G systems 805 and 810. In this case, TSN blocks may be geographically distributed interconnecting more than one 5G systems using a TSN compatible transport 820 including but not limited to a 5G backbone, private network tunnel or other wide area networks. In this subject invention, the TSN blocks are configured by their respective CMs 215. In some implementations, the configuration across the two TSN-5G systems 805, 810 may be coordinated through a centralized configuration utility (CNC) 112. In some other implementations, the CMs 215 between the two TSN-5G systems 805, 810 may communicate directly. In some implementations, multiple CUC's and CNC's may be used to capture the user requirements and generate TSN solutions and techniques provided in this disclosure (e.g., TSN Schedule, forwarding instruction, etc.).

Figure 7:
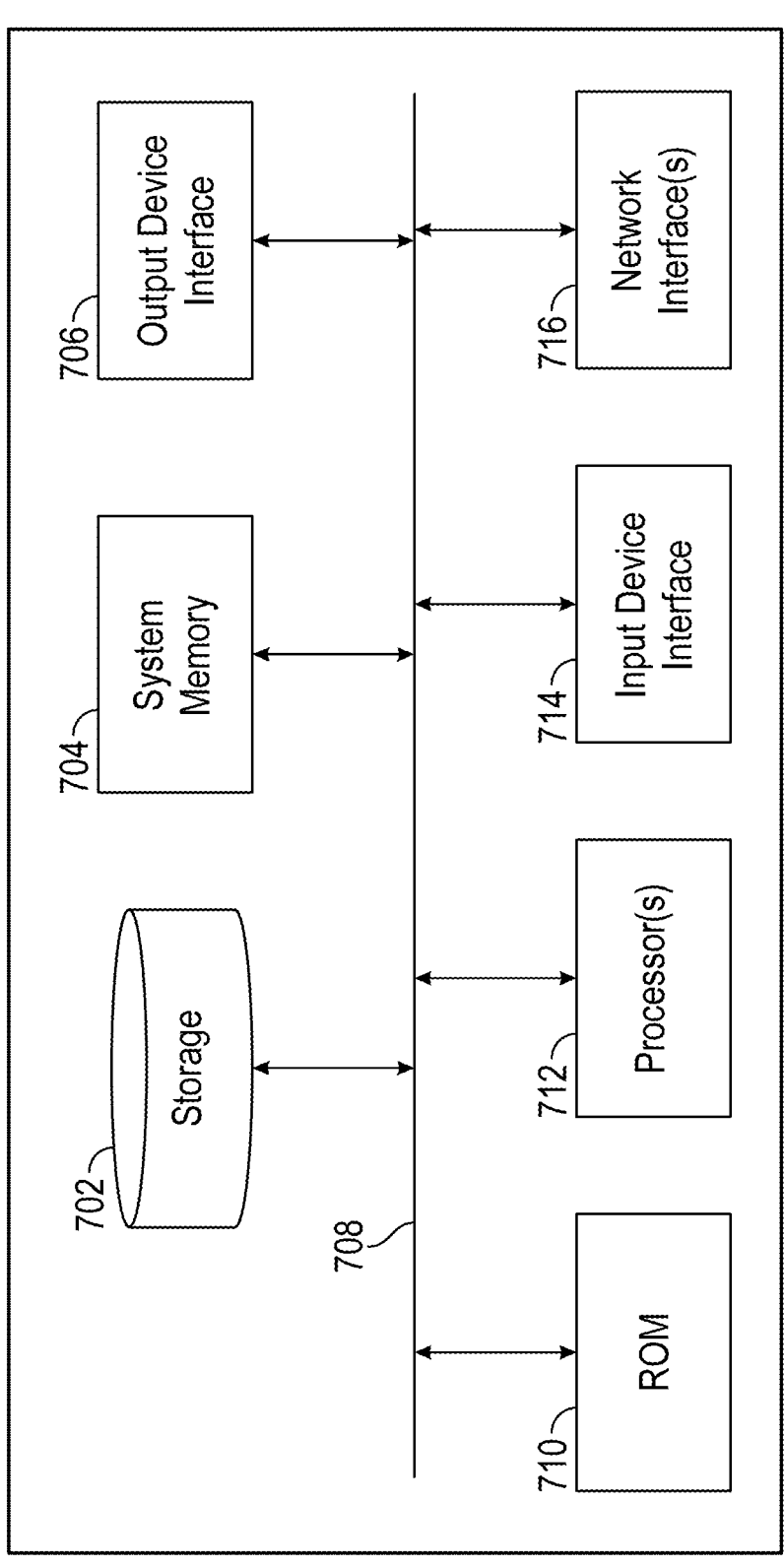
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of the TSN block 202 and/or the configuration module 215. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710 (which are each implemented as a non-transitory computer-readable medium). From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet). Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks. The functions disclosed herein may be implemented using quantum computing, pulse-coupled oscillation (PCO)/Ising computing.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a wireless network (e.g., the 5G network 106) is provided, the wireless network being configured to support time-sensitive deterministic communication based on a time-sensitive network (TSN) mechanism. The wireless network may include a plurality of discrete communication network (CN) components, e.g., components 110, 118, 120, 122, 124, 126, 140, 190, etc., discussed above. Each CN component may be configured to provide a discrete functionality for data communication from a source device (e.g., 102) across the wireless network (e.g., 106) to a destination device (e.g., 104). A processor (e.g., 402) may be arranged to configure at least one (e.g., 140) of the plurality of CN components with a set of TSN parameters of the TSN mechanism such that the at least one of the plurality of CN components supports time-sensitive deterministic communication as a TSN block (e.g., 202-3) in a TSN network in accordance with the set of TSN parameters. The at least one of the plurality of CN components that is being configured with the set of TSN parameters is the 5G transport network channel 140 connecting the RAN 120 and the UPF 122. In some implementations, the processor is arranged to configure each of the plurality of CN components with a respective set of TSN parameters of the TSN mechanism such that each of the plurality of CN components supports time-sensitive deterministic communication as a corresponding TSN block in the TSN network in accordance with the respective set of TSN parameters.

The wireless network may further include a configuration module (e.g., 110 or 210) configured to determine the set of TSN parameters for the at least one of the plurality of CN components. The set of TSN parameters may include one or more of a TSN stream identification, a transmission schedule, a deadline or delay budget, a filtering configuration, and a redundancy scheme. In some implementations, the processor is configured to assign one or more CN resources for data transmission by the at least one of the plurality of CN components in accordance with the transmission schedule or the deadline or delay budget. In some implementations, the configuration module is configured within a control plane component (e.g., SMF 126) of the plurality of CN components.

In some implementations, the configuration module is configured to determine the set of TSN parameters based on one or more CN attributes assigned to the at least one of the plurality of CN components, wherein the one or more CN attributes relate to the discrete functionality provided by the at least one of the plurality of CN components.

The processor may be configured to monitor data transmission by the at least one of the plurality of CN components and report to the configuration module any change to the set of TSN parameters or the one or more CN attributes, and the configuration module is configured to update the set of TSN parameters based on the reported change.

In accordance with aspects of the disclosure, a wireless network (e.g., the 5G network 106) configured to support time-sensitive deterministic communication based on a time-sensitive network (TSN) mechanism is provided. The wireless network may include a plurality of discrete communication network (CN) components, e.g., components 110, 118, 120, 122, 124, 126, 140, 190, etc., discussed above. Each CN component may be configured to provide a discrete functionality for data communication from a source device (e.g., 102, 204) across the wireless network (e.g., 106) to a destination device (e.g., 104, 206). The wireless network may include a plurality of configuration modules (e.g., 210, 215) interconnected (e.g., via 230) in a certain arrangement and configured to provide a unique set of TSN parameters to each of the plurality of CN components such that each of the plurality of CN components supports time-sensitive deterministic communication as a corresponding TSN block in a TSN network in accordance with the respective unique set of TSN parameters. The plurality of configuration modules may be interconnected in a hierarchical arrangement, a mesh arrangement, a star arrangement, a tree arrangement, a combination thereof.

As illustrated and discussed above in relation to FIG. 2, the corresponding TSN block (e.g., 202-3) may be configured to receive the unique set of TSN parameters thereof from a configuration module (e.g., 215-b and/or 215-c) of the plurality of configuration modules assigned to the corresponding TSN block. The unique set of TSN parameters may include one or more of a TSN stream identification, a transmission schedule, a deadline or delay budget, a filtering configuration, and a redundancy scheme.

In some implementations, at least one of the plurality of configuration modules is configured as a CUC 114 and/or a CNC 112 and implemented within the SMF 126 of the control plane and/or within the TSN block 202-3 (which represents the TSN configuration of the 5G transport channel 140). In implementations in which the 5G transport channel 140 is being configured with TSN parameters in accordance with various aspects of this disclosure, the RAN 120 and the UPF 122 each may be configured to support the functionality of a TSN Talker and/or Listener as defined in IEEE P802.Qdj [xx]. The SMF 126/CUC 114 may be responsible to convert the 5GS parameters from/to the parameters in IEEE P802.1Qdj [xx]. The SMF 126/CUC 114 may be configured to communicate with the TSN Talker and/or Listener in the RAN 120 and the UPF 122 to exchange data sets defined in IEEE P802.1Qdj [xx]. In some implementations, during the Qos flow establishment or modification, the SMF 126/CUC 114 creates the Talker Group and Listener Group per QoS Flow as defined in the Annex I.x and sent to TSN CNC 112. The TSN CNC 112 uses the Talker Group and Listener Group as input to select path(s) and calculate schedules in TSN. The TSN CNC 112 provides a Status group to the SMF 126/CUC 114. The SMF 126/CUC 114 provides the Status group to the TSN Talker and/or Listener in the RAN 120 and the UPF 122, respectively. After receiving the Status group, the TSN Talker and/or Listener send the data to N3 interface according to the configuration in the Status group.

In some implementations, a processor (e.g., 402) is configured to assign one or more CN resources for data transmission by at least one of the plurality of CN components in accordance with the transmission schedule or the deadline or delay budget.

In accordance with aspects of the disclosure, a system (e.g., system 100 as illustrated and described with respect to FIG. 8) is provided. The system includes a first wireless network (e.g., 805) and a second wireless network (e.g., 810). The first wireless network may include a first plurality of discrete communication network (CN) components, each CN component configured to provide a discrete functionality for data communication via the first wireless network, wherein at least one of the first plurality of CN components is configured to provide time-sensitive deterministic communication in accordance with a first set of TSN parameters. The second wireless network may include a second plurality of discrete CN components, each CN component configured to provide a discrete functionality for data communication via the second wireless network, wherein at least one of the second plurality of CN components is configured to provide time-sensitive deterministic communication in accordance with a second set of TSN parameters.

In some implementations, a TSN transport channel (e.g., 820) is provided, which is configured to facilitate time-sensitive deterministic communication of data exchanged between the first wireless network and the second wireless network, in accordance with a third set of TSN parameters. The TSN transport channel may be communicatively connected with a first TSN translator (e.g., NW-TT in 122 of 805) of the first wireless network and a second TSN translator (e.g., NW-TT in 122 of 810) of the second wireless network.

In accordance with aspects of the disclosure, a method is provided that includes configuring at least one (or each) of a plurality of CN components of a wireless network (e.g., a 5G network) with a set of TSN parameters of the TSN mechanism such that the at least one (or each) of the plurality of CN components supports or provides time-sensitive deterministic communication as a TSN block in a TSN network in accordance with the set of TSN parameters. The at least one of the plurality of CN components may be the 5G transport network channel connecting the RAN and the UPF.

The method may further include determining the set of TSN parameters for the at least one of the plurality of CN components, e.g., at one or more configuration modules. The set of TSN parameters may include one or more of a TSN stream identification, a transmission schedule, a deadline or delay budget, a filtering configuration, and a redundancy scheme. The method may further include assigning one or more CN resources for data transmission by the at least one of the plurality of CN components in accordance with the transmission schedule or the deadline or delay budget. The method may also include monitoring data transmission by the at least one of the plurality of CN components and reporting to the configuration module any change to the set of TSN parameters or the one or more CN attributes, wherein the set of TSN parameters is updated based on the reported change.

As noted above, each of the plurality of distributed configuration modules is configured to individually schedule a flow (e.g., TSN flow) in each TSN domain including series of TSN blocks in the integrated TSN-communication network system. There is no entity that can schedule all TSN flows in the all integrated TSN-communication network systems or connect schedules for all TSN flows. Even though a neighbor communication network provides a better network environment (e.g., 5G windfarm communication), a TSN flow of an individual TSN domain must passes a communication network of the integrated TSN-communication network system in which the individual TSN domain is configured. In this case, TSN flows may require the ability to be extended through other integrated TSN-communication network systems.

To address the above-discussed issues, the subject technology provides for an architecture in which a communication network in a system supports time-sensitive interconnection communication. The communication network comprises a processor arranged to configure at least one of the plurality of communication network components based on a time sensitive communication schedule of a flow (e.g., TSN flow) which passes through the at least one of the plurality of communication network components. The at least one of the plurality of communication network components is configured to as at least one waypoint to provide the time sensitive interconnection communication. The at least one waypoint communicates with at least one of other waypoints in another network integrated with a neighbor communication network to connect the time sensitive communication schedule with another time sensitive communication schedule of another flow passing through the neighbor communication network instead of rescheduling all time sensitive communication schedules.

Figure 9:
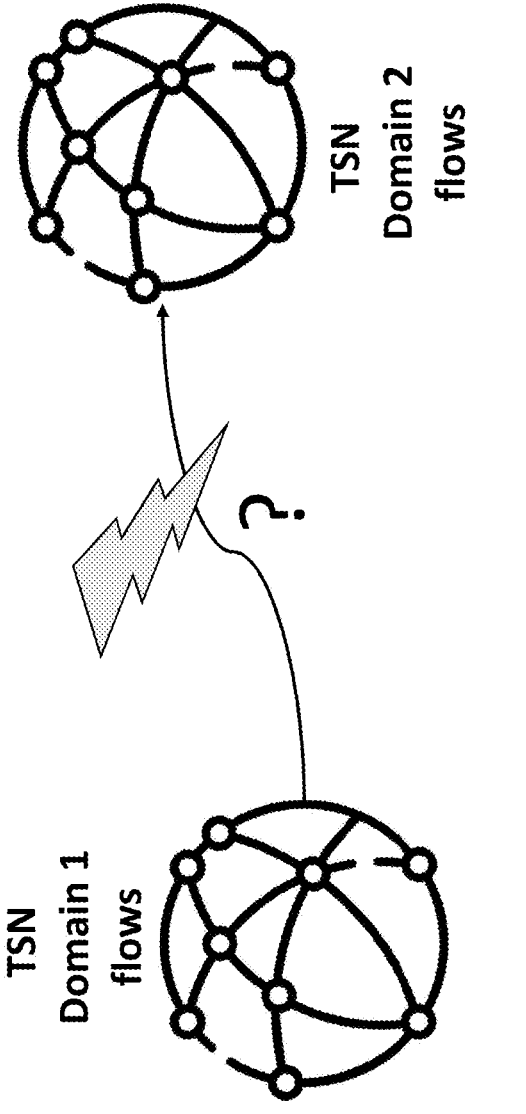
FIG. 9 illustrates an example of TSN domains in accordance with one or more implementations.

FIG. 9 illustrates an example of TSN domains in accordance with one or more implementations.

In some implementations, an integrated TSN-communication network system similar to the system 100 and the system 200 is configured to support and manage deterministic TSN data flows between a data source ("source device") and a data destination device ("destination device") via a communication network system (e.g., a wireless network or a network system compatible with 3GPP standards) in accordance with TSN configuration including a TSN schedule determined by TSN scheduler (e.g., at least one configuration module). The TSN scheduler is configured to schedule a TSN flow within a TSN domain. In some embodiments, the TSN domain includes a series of TSN blocks or a disaggregated structure including a plurality of TSN blocks 202-1 to 202-N in the integrated TSN-communication network system. In some implementations, the integrated TSN-communication network system may include a set of distributed TSN domains including TSN domain 1 and TSN domain 2, each of the TSN domain 1 and the TSN domain 2 is independently scheduled. As shown in FIG. 9, a first TSN flow in the TSN domain 1 is independently scheduled from a second TSN flow in the TSN domain 2. As described above, there is no entity that schedules all TSN flows in the entire integrated TSN-communication network system. The lightning symbol indicates a sudden request for a new TSN flow between two different TSN domains and the question mark indicates the problem of determining how the new TSN flow will be scheduled. It is possible that the interconnection may be via communication network such as 5G, 5G+,6G wireless network.

Figure 10:
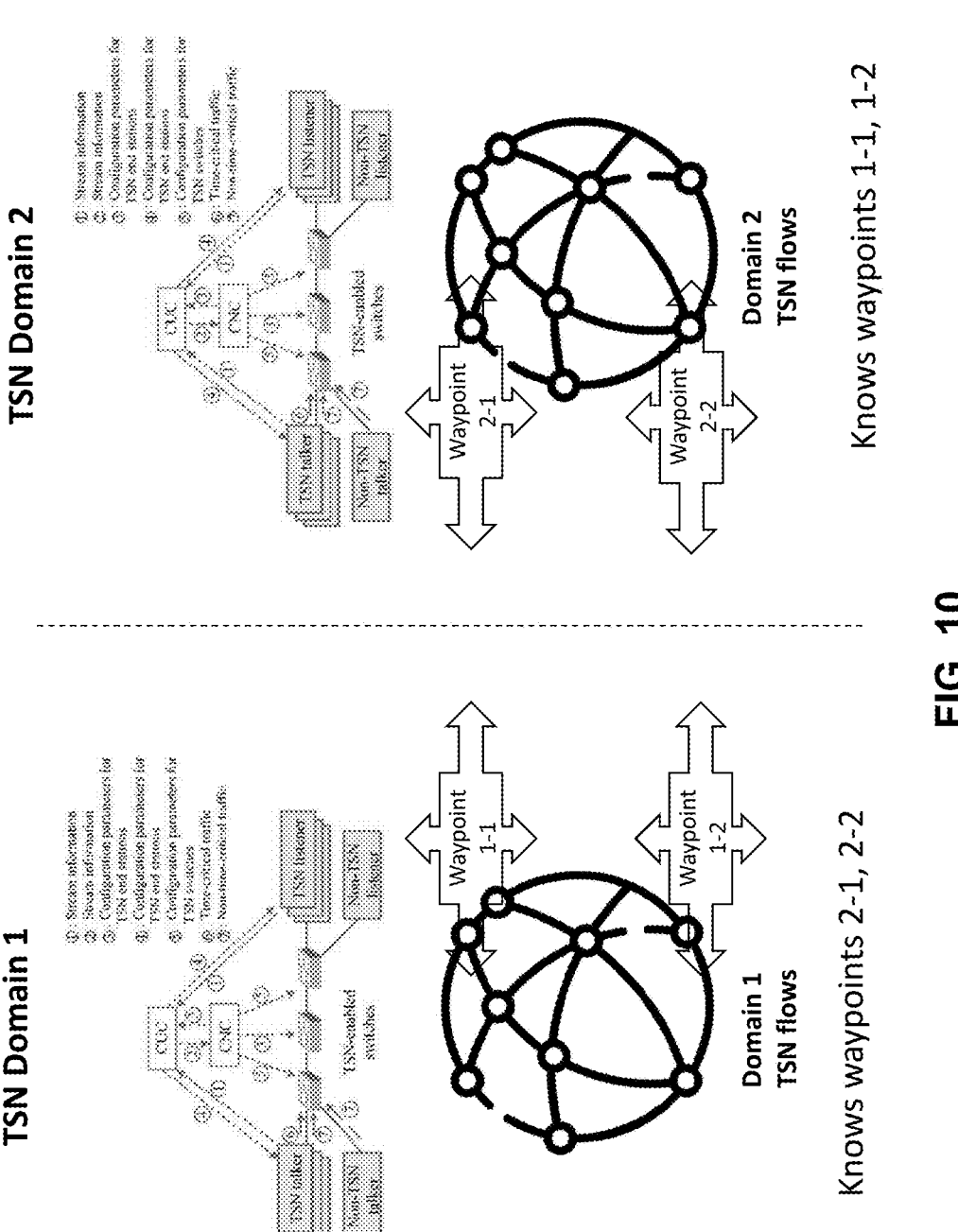
FIG. 10 illustrates an example of multiple TSN domains in accordance with one or more implementations.

FIG. 10 illustrates an example of multiple TSN domains in accordance with one or more implementations.

As described above, in some implementations, a system may include a set of distributed TSN domains including TSN domain 1 and TSN domain 2 which are independently scheduled. The system depicted in FIG. 10 may be referred to as an integrated TSN-communication network system. The system is configured to support time sensitive communication. As shown in FIG. 10, each of TSN domain 1 and TSN domain 2 may be configured in the system similar to the system 100 and the system 200 as discussed above.

The integrated TSN-communication network system provides a configuration controller which is implemented as a centralized configuration controller 110 and/or distributed controller 210. The configuration controller includes a CUC (e.g., the CUC 114) and a CNC (e.g., the CNC 112) which operates in accordance with TSN specifications (e.g., IEEE 802.1Qcc). The CUC and CNC may exchange stream information and configuration parameters for TSN end station and/or TSN switch (or bridge) via API. Talkers/Listeners located in the TSN end stations represent the user side of the API and TSN bridges represent the network side of the API. Referring to FIG. 2 and FIG. 3, at least one communication network component (e.g., 5G component) is configured to emulate as a TSN block in accordance with TSN specifications (e.g., IEEE 802.1Qcc) such as TSN bridges (e.g., Bridges in FIG. 9), TSN end system (i.e., as Talkers/

Listeners). As described above, a TSN block is configured to support time sensitive communication. The configuration controller can be referred to as a configuration module.

As described above, a distributed controller may include a plurality of distributed configuration modules (e.g., configuration modules 215-a to 215). Each configuration module may be configured to determine and provide to TSN blocks controlled by the configuration module configuration data including a TSN schedule for one or more TSN flows to be transmitted through the TSN blocks.

In some implementations, the TSN domain 1 and the TSN domain 2 may include a series of TSN blocks in a disaggregated structure including a plurality of TSN blocks 202-1 to 202-N which are configured by communication network components in the integrated TSN-communication network system. Referring to FIG. 8, the TSN domain 1 is configured in a first communication network (e.g., 5G system 805) compatible with 3GPP standards and the TSN domain 2 is configured in a second communication network (e.g., 5G system 810) compatible with 3GPP standards which is a neighbor communication network of the first communication network. The first communication network includes a first TSN scheduler (e.g., a distributed configuration module 210) which schedules the first TSN flow within the TSN domain 1 including one or more first communication network components in the first communication network. The second communication network includes a second TSN scheduler (e.g., a distributed configuration module 210) which schedules the second TSN flow within the TSN domain 2 including one or more second communication network components in the second communication network. The first TSN scheduler can be referred to as first scheduler and the second TSN scheduler can be referred to as a second scheduler.

As described above, each TSN flow in each TSN domain is independently scheduled by a TSN scheduler that assumes fixed, non-changing paths through the TSN-communication network between the talker/listener devices and TSN blocks. Thus a first TSN flow is scheduled in the TSN domain 1 and a second TSN flow is scheduled in the TSN domain 2, independently. The first TSN flow must pass through its communication network (e.g., the first communication network) in which the TSN domain 1 is configured and does not interconnect other communication networks (e.g., the second communication network) even in the case that other communication networks provide better communication environments. In order to connect at least two independently developed TSN schedules and create a feasible global TSN schedule which enables the TSN flow pass through other communication networks, the communication network includes at least one waypoint for each TSN domain. The TSN schedule can be referred to as a time sensitive communication schedule. As shown in FIG. 10, the TSN domain 1 includes at least one first waypoint (e.g., a waypoint 1-1, a waypoint 1-2) and the TSN domain 2 includes at least one second waypoint (e.g., a waypoint 2-1, a waypoint 2-2).

A waypoint is an intermediate point or place on a route or line of travel, a stopping point or point at which course for the TSN flow is changed. The waypoints are an abstraction in the TSN schedule and necessarily equivalent to Talker or Listener endpoints. The waypoints are intermediate points along the TSN flow (e.g., the first TSN flow, the second TSN flow) that define an egress port that the TSN flow must pass through and optionally the phase offset within the cycle time at which frames should pass through the waypoint. The waypoints are provided to ensures that the TSN flow arrives at a predefined location along a path at a particular periodic time interval. In some implementations, waypoints may anticipate changes in the TSN schedule allowing a future connection to tap into a point and time within the TSN cycle. The waypoints are an extension to standard user input to the configuration module (e.g., CUC, CNC) along with Talkers, Listeners, maximum flow latencies, network topology, and other standard input. The waypoints may advertise their existence and negotiable options via LLDP, as well as YANG or any other standards-based network management mechanism. In some implementations, the waypoint is an abstraction for interfaces of switches/bridges as potential locations were offers and counter-offers may be made for deterministic interconnection with another deterministic configuration domain. The waypoint is designed to reserve a spot (both location and timeslot) in a schedule for a future potential connection from another domain and turn split/merge traffic (e.g., TSN flow) when needed.

As described above, at least one configuration module in each TSN domain (e.g., the TSN domain 1, the TSN domain 2) configures at least one communication network component based on its local TSN schedule so that the TSN flow passes through the at least one communication network as a TSN block. In some implementations, the at least one configuration module in each TSN domain may configure the at least one communication network component with at least one waypoint to provide the TSN interconnection communication based on AI-ML Application Functions. The at least one configuration module in a TSN domain may coordinate with other configuration modules in other TSN domains so that the at least one waypoint (e.g., the waypoint 1-1) communicates with at least one of other waypoints (e.g., the waypoint 2-1) in a neighbor communication network via the TSN interconnection communication. The TSN schedule requirements such as cycle time, gate control, etc., are exchanged between two TSN domains until they achieve a composite TSN schedule by connecting two TSN schedules (e.g., the first TSN schedule and the second TSN schedule) developed independently in each of two TSN domains (e.g., the TSN domain 1 and the TSN domain 2) instead of rescheduling all TSN schedules. Based on the composite TSN schedule, a path is configured to transmit the first TSN flow across multiple TSN domains.

The integrated TSN-communication network system provides 3GPP AI-ML Application Functions (or AI-ML Application Functions) to support the TSN interconnection communication. 3GPP AI-ML Application Functions are specified by 3GPP TS 24.519 version 17.1.0 Release 17 which is incorporated by reference herein in its entirety. For example, the distributed TSN scheduler (e.g., configuration module (e.g., 110 or 210)) may have its own AI/ML agent for AI-ML Application Functions. In some implementations, AI/ML capabilities are initially added to YICES implementation for TSN mechanism. The AI-ML Application Functions may utilize market-based techniques, trading TSN flow priority times with neighbors (e.g., agent in another configuration module in neighbor communication network, the second communication network, etc.) until a Nash Equilibrium is reached. Each agent can "pay" its neighbor to transport its TSN flow, gaining value for each flow that meets its TSN schedule requirements. Payment is proportional to the priority, importance, and capacity of the TSN flow as determined by the agent carrying the TSN flow. This works to reach an agreement that achieves the most value for the entire system, even if some flows cannot feasibly be scheduled.

In some implementations, at least one configuration module in each TSN domain configures waypoints. The placement of the waypoints can be optimized based on charging control of the TSN flow as specified by 3GPP TS 29.513 V18.0.0 which is incorporated by reference herein in its entirety. The charging may be based upon quality of the TSN flow which include bandwidth, latency, and jitter and the cost is a function of the quality, among other things such as competitor pricing. In some implementations, the waypoints include three types: a null waypoint, a splitting waypoint, and a merging waypoint.

In some embodiments, a waypoint is simply a CUC within a TSN configuration domain, wherein TSN Talkers and Listeners are configured as per IEEE 802.1Q. This is an example of a null waypoint.

In some implementations, the null waypoint identifies a location and optionally a time that Ethernet frames must egress through a port (or null waypoint). It is purpose is to ensure that the TSN scheduler schedules a flow through the specified port along its path.

In some implementations, a splitting waypoint is the null waypoint that provides splitting functionality to split the TSN flows. Thus, the split TSN flows transmit over multiple egress ports or multiple paths as specified by IEE 802.1CB which is incorporated by reference herein in its entirety. The splitting waypoint may duplicate Ethernet frame transmission over multiple egress ports, where the splitting functionality can be enabled or disabled. Its purpose is to anticipate a future connection, for example over 5G transport, that may need to interconnect with the TNS domain rapidly and dynamically while it is operating without interfering with it.

In some implementations, a merging waypoint is the null waypoint that can accept traffic entering at a specified offset in the cycle time. Its purpose is to allow a TSN domain to receive one or more split flows with a separate TNS domain rapidly and dynamically while it is operating without interfering with it. The merging waypoint is scheduled with the capability of handling all input flows whether they are enabled or not. The merging waypoint receives one or more split TSN flows from the at least one of other waypoints (e.g., at least one second waypoint) in the neighbor communication network (e.g., the second communication network).

In some implementations, at least one configuration module in a TSN domain (e.g., the TSN domain 1) generates configuration information which is used to configure each TSN domain. The at least one configuration module in the TSN domain advertise the configuration information to configuration modules in other TSN domains. In some implementations, the waypoint consists of the following waypoint parameters in the configuration information:

Stream ID—a TSN flow identifier of the TSN flow being configured.

Ethernet address—represents an address of a TSN flow that egress from TSN network.

Cycle time and offset—represents an offset within a cycle time that ethernet frames of the TSN flow transmit through the at least one waypoint.

Waypoint Stream split table—There is one waypoint Stream split table per a network device interface, with one waypointSplitEntry per Stream splitting function per set of stream_handle values. The stream_handle represents a TSN flow identified by the stream ID.

The Waypoint Stream split table includes following parameters:

WaypointSplitEntry—Each entry in the Stream split table specifics a port and direction on which an instance of the waypoint Stream splitting function is to be instantiated, and the list of stream_handles specifying its operation.

WaypointsplitEntry is included in the waypoint stream split table and specifies a port and direction on which an instance of the splitting function is instantiated.

Waypointsplitenabled represents whether the splitting function is enabled. If true, the Waypointsplitenabled indicates that messages should be sent over the split, if false, the messages take a main path only. The splitting waypoint is a point along a network path where frames may be redirected along a different adjacent path if the split is enabled. The main path is a path the frames take if the split is not enabled.

WaypointSplitInputIdList represents a list of stream_handles (tsnStreamIdHandle values) corresponding to TSN flows that are to be split.

WaypointSplitOutputIdList represents a list of stream_handles (tsnStreamIdHandle values) corresponding to the TSN flows into which an input packet is to be split.

WaypointSplitport represents a port on which the instance of the splitting function is specified by the waypointSplitInputIdList and the waypointSplitOutputIdList.

WaypointSplitDirection is a Boolean object indicating whether the instance of the splitting function is to be placed on an out-facing or in-facing side of the port indicated by the waypointSplitport. The splitting function performing the stream_handle translations specified by waypointSplitInputIdList and waypointSplitOutputIdList.

Waypoint join may be identified by the stream ID and the ingress point to a device in another domain.

Description of the Waypoint functionality aligns with the operation of a conventional TSN Bridge as specified by IEEE 802.1CB. For a reasonably complex network topology, there can be many possible paths that configuration module (e.g., CNC 112) can choose points on a network path for the TSN interconnection communication. The waypoints allow certain specific points along the path to be included, while the rest of the path can be determined by the configuration module without redundancy requirements and with optional control over which paths are taken through the waypoint.

Thus, in some implementations, a communication network configured to support time-sensitive interconnection communication comprises a plurality of communication network components (e.g., 5G components, 118, 120, 122, 124, 126, etc.), each communication network component configured to provide a functionality for data communication from a source (e.g., 204) device across the communication network to a destination device (e.g., 206) and a configuration module (e.g., 110, 112, 114, 210) arranged to configure at least one of the plurality of communication network components based on a time sensitive communication schedule of a flow which passes through the at least one of the plurality of communication network components. The at least one of the plurality of communication network components is configured to at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

In some implementations, the configuration module can be implemented as, but is not limited to, a processor and a non-transitory computer-readable storage medium storing one or more programs for execution by the processor. The one or more programs include instructions for configuring at least one of a plurality of communication network components based on a time sensitive communication schedule of a flow which passes through the at least one of the plurality of communication network components. The at least one of the plurality of communication network components is configured to at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

In some implementations, the at least one waypoint is an intermediate point along the flow and defines an egress port which the flow passes through so that the flow pass through the at least one of other communication network components in the neighbor communication network. In some implementations, the at least one waypoint includes a null waypoint which identifies a location and a time that Ethernet frames egress through a port corresponding to the null waypoint. In some implementations, the at least one waypoint includes a splitting waypoint which provides splitting functionality to split the flow so that the split flows transmit over multiple egress ports. In some implementations, the at least one waypoint includes a merging waypoint which receives one or more split flows from the at least one of other communication network components in the neighbor communication network. In some implementations, the configuration module generates configuration information for the at least one waypoint, the configuration information including: a stream ID, an ethernet address, cycle time and offset information, a waypoint stream split table, a waypointsplitentry, waypointsplitenabled information, a waypointSplitport, a waypointSplitDirection, a waypointSplitInputIdList, a waypointSplitOutputIdList and Waypoint join. In some implementations, the stream ID identifies the flow, the ethernet address represents address of a flow that egress from a network, the cycle time and offset information represents an offset within a cycle time that frames of the flow transmit through the at least one waypoint and the waypoint join is simply identified by the stream ID and the ingress point to a device in the neighbor communication network. In some implementations, the waypoint stream split table includes: the waypointsplitentry is included in the waypoint stream split table and specifies a port and direction on which an instance of the splitting function is instantiated, the waypointsplitenabled information represent whether the splitting function is enabled, the waypointSplitInputIdList represents a list of stream_handles (tsnStreamIdHandle values) corresponding to flows that are to be split, the waypointSplitOutputIdList represents a list of stream_handles (tsnStreamIdHandle values) corresponding to the flows into which an input packet is to be split, the waypointSplitport represents a port on which the instance of the splitting function is specified by the waypointSplitInputIdList and the waypointSplitOutputIdList and the waypointSplitDirection is a Boolean object indicating whether the instance of the splitting function is to be placed on an out-facing or in-facing side of the port indicated by the waypointSplitport. In some implementations, the at least one of the plurality of other communication network components is configured to as the at least one of other waypoints. In some implementations, the transmission window offer includes cycle time and offset information represents an offset within a cycle time that frames of the flow transmit through the at least one waypoint and open duration. In some implementations, the time sensitive communication schedule includes a time sensitive network (TSN) schedule.

In some implementations, a system as depicted in FIG. 10 is configured to support time sensitive interconnection communication. The system includes a first communication network (e.g., 5G system 805 in where the TSN domain 1 is configured) and a second communication network (e.g., 5G system 805 in where the TSN domain 2 is configured). The first communication network comprises a first scheduler (e.g., 110, 112, 114, 210) configured to schedule a first flow within a first domain including one or more first communication network components in the first communication network and at least one first waypoint configured to provide the time sensitive interconnection communication. The second communication network comprises a second scheduler (e.g., 110, 112, 114, 210) configured to schedule a second flow within a second domain including one or more second communication network components in the second communication network and at least one second waypoint configured to provide the time sensitive interconnection communication. In some implementations, the at least one first waypoint communicates with the at least one second waypoint to create a composite time sensitive communication schedule such that the first flow passes from the first communication network to the second communication network via the time sensitive interconnection communication.

In some implementations, the first scheduler and the second scheduler can be implemented as, but is not limited to, a processor and a non-transitory computer-readable storage medium storing one or more programs for execution by the processor, respectively.

In some implementations, a system as depicted in FIG. 10 may include a device configured to provide functionalities for time sensitive interconnection communication as described in this disclosure. The device may include, but is not limited to, a scheduler (e.g., TSN scheduler) and a configuration module (e.g., 110, 112, 114, 215). The scheduler is configured to schedule a flow within a domain (e.g., TSN domain) including a plurality of communication network components in a communication network. For example, the scheduler is configured to generate a time sensitive communication schedule of the flow. The configuration module is arranged to configure at least one of the plurality of communication network components based on the time sensitive communication schedule of a flow which passes through the at least one of the plurality of communication network components. In some implementations, each communication network component configured to provide a functionality for data communication from a source device across the communication network to a destination device. The at least one of the plurality of communication network components is configured, by the configuration module, at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network. In some implementations, the device, the scheduler and the configuration module are implemented as a processor and a memory (which is implemented as a non-transitory computer-readable medium), respectively. The memory may store a program(s), software instructions reproducing algorithms, etc., which, when executed, performs various functions described in the disclosure and the processor configured to execute the program(s), software instructions reproducing algorithms, etc. In some implementations, the method for time sensitive interconnection communication is provided. For example, the method for time sensitive interconnection communication includes, but is not limited to, steps, functions which are provided by the system, devices, modules, controllers, processors, as described in the disclosure. For example, the method includes scheduling a flow within a domain (e.g., TSN domain) including a plurality of communication network components in a communication network and configuring at least one of the plurality of communication network components based on the time sensitive communication schedule of a flow which passes through the at least one of the plurality of communication network components. The method further includes configuring the at least one of the plurality of communication network components as at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

Figure 11:
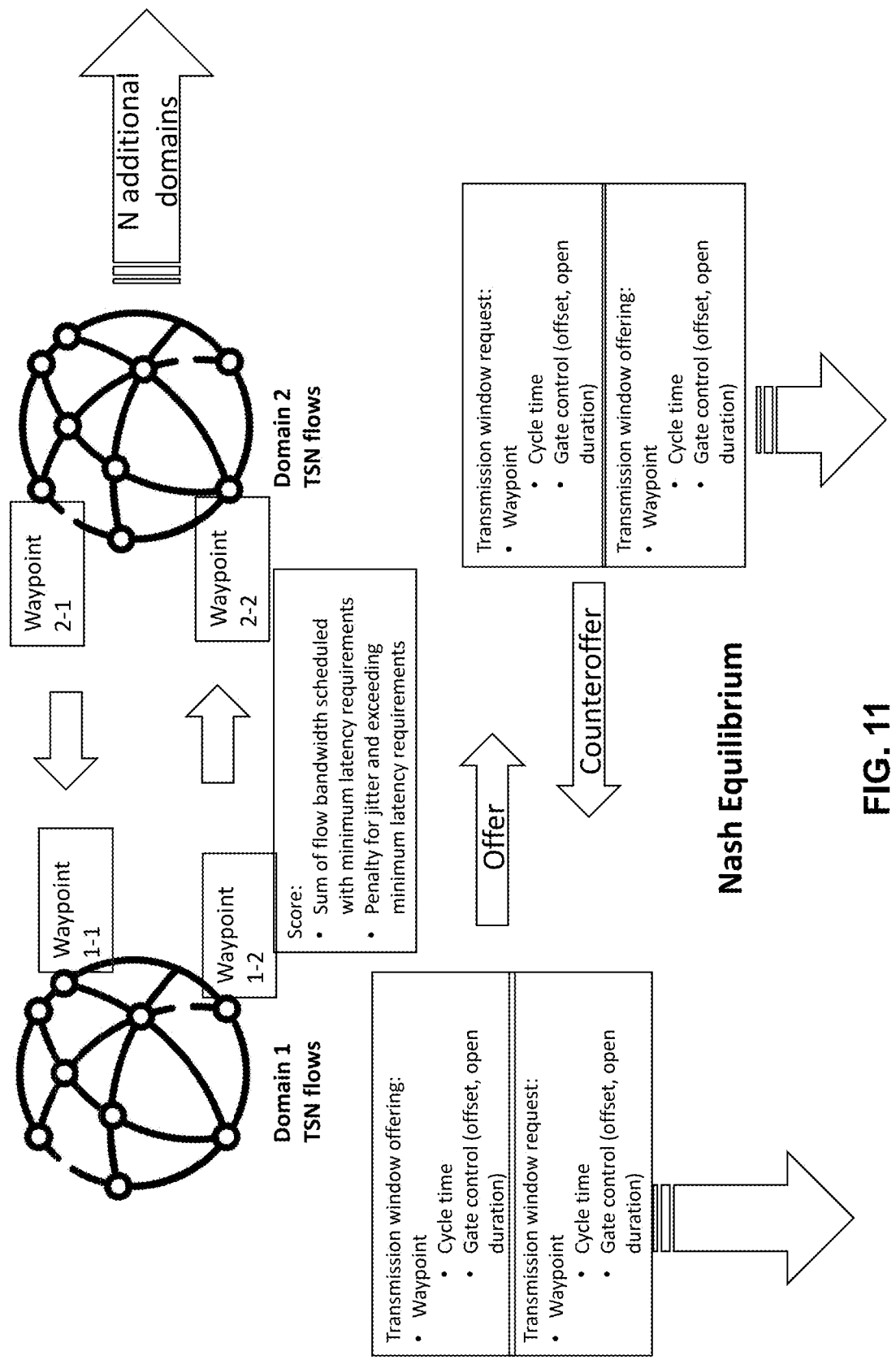
FIG. 11 illustrates an example of TSN interconnection communication in accordance with one or more implementations.

FIG. 11 illustrates an example of interconnection communication in accordance with one or more implementations.

As noted above, at least one first waypoint (e.g., the waypoint 1-1, the waypoint 1-2) in TSN domain 1 and at least one second waypoint (e.g., the waypoint 2-1, the waypoint 2-2) in TSN domain 2 are configured to provide the interconnection communication based on AI-ML Application Functions.

Each TSN domain knows its full configuration including topology and flow requests interpreted by at least one configuration module in each TSN domain which is added by 3GPP AI-ML Application Functions. Flow requests that ingress and/or egress the domain must pass through a waypoint. As shown in FIG. 11, waypoints in each TSN domain are exposed to all interested domains.

While the first TSN flow flows through the at least one first waypoint, an offer (transmission window offer) including cycle time and gate control (offset, open duration) of the first TSN flow in the TSN domain 1 may be provided to the TSN domain 2. The transmission window offer refers to the standard TSN gate control mechanism. The gate control list schedules when the transmission gate opens and closes. The transmission window refers to when, and for how long, a particular transmit window remains open for a TSN flow at a particular waypoint (e.g., waypoint 1-1, waypoint 1-2 in TSN domain 1). In response to the offer, a counteroffer (transmission window counter request) including cycle time and gate control information (offset, open duration) of the second TSN flow in the TSN domain 2 is provided to the TSN domain 1 while the second TSN flow flows through the second waypoint. In some implementations, the offer and the counteroffer may be provided by any signaling mechanism between TSN domains. The cycle time and offset information represents an offset within a cycle time that frames of the first TSN flow transmit through the first waypoint and open duration. The open duration may refer to normal TSN gate control through the first waypoint. As illustrated in FIG. 11, the exchange of the offer and the counteroffer for the first waypoints and the second waypoints continues until Nash equilibrium reaches resulting a consensus on TSN interconnectivity. As noted above, an AI/ML agent within TSN domain 1 and an AI/ML agent within TSN domain 2 score a sum of the TSN flow bandwidth scheduled with minimum latency requirements and penalty for jitter and exceeding minimum latency requirements respectively.

In some implementations, the distributed TSN scheduling protocol exchange could take place via intent driven management (3GPP TS 28.312) using a RESTful HTTP-based solution set.

In some implementations, each TSN configuration domain may advertise its desired schedule, including offers and counter-offers, via charging operations described in 3GPP TS 32.282 where TSN configuration information is shared with peer TSN configuration domains in addition to, or instead of, a billing domain.

In some implementations, scoring function is referred to as utility function in formal game theory. The utility function is defined as the sum of scheduled TSN flow bandwidth that meets or exceeds a specified jitter requirement reduced by the proportion of bandwidth failing to meet jitter requirements scaled by the amount of jitter it suffers. This depends on how the jitter is measured and how severely the application is impacted by the jitter. For examples, the proportion of bandwidth arriving outside the required jitter bounds can be computed assuming a normal distribution given frame delay mean and variance N (mu, sigma^2). Using the normal distribution, the proportion of TSN bandwidth falling outside a given jitter bounds can be readily computed and weighted by the amount that it exceeds the bounds, again, depending upon the impact of jitter on the application flow being negotiated. The result of the utility function is a single scalar value that indicates the "goodness" of the offer or the counteroffer and in this example, the amount of bandwidth and the amount of jitter have opposite effects on the utility function. TSN domains are likely able to offer higher bandwidth at the cost of higher jitter. It is also possible to include financial cost into the utility function as well at an appropriate weighting of financial cost with the bandwidth and the jitter. It's also possible to minimize the difference between when the TSN gate opens for a flow from the time expected between two different TSN domains as this could cause buffering and additional latency between domains. This gate open time difference can also be included in the utility function, appropriately weighted relative to other factors. The utility function may include, but is not limited to, security, reliability, availability that are appropriately weighted for the applications involved.

It is understood that "jitter" refers to all measurements discussed in 3GPP TS 22.104 "Service requirements for cyber-physical control applications in vertical domains" related to timeliness and the likelihood of a message missing transmission during its assigned time window.

In some implementations, each TSN domain has its own independent utility function and resulting utility value that it is attempting to maximize. Each TSN domain is attempting to maximize its own independent utility function via proposing offers and deciding when to accept counteroffers. This is taking place as part of TSN configuration, which may be an ongoing process in parallel with normal operation requiring periodic TSN dynamic rescheduling when configuration occurs. Actual configuration only takes place only when all domains supporting a TSN flow have reached consensus, by having done all they can to maximize their utility functions. In game theory, this a Nash equilibrium, which is reached if no user can improve her or his utility by a unilateral deviation (offer, counteroffer, or perhaps rescheduling of its own domain).

Figure 12:
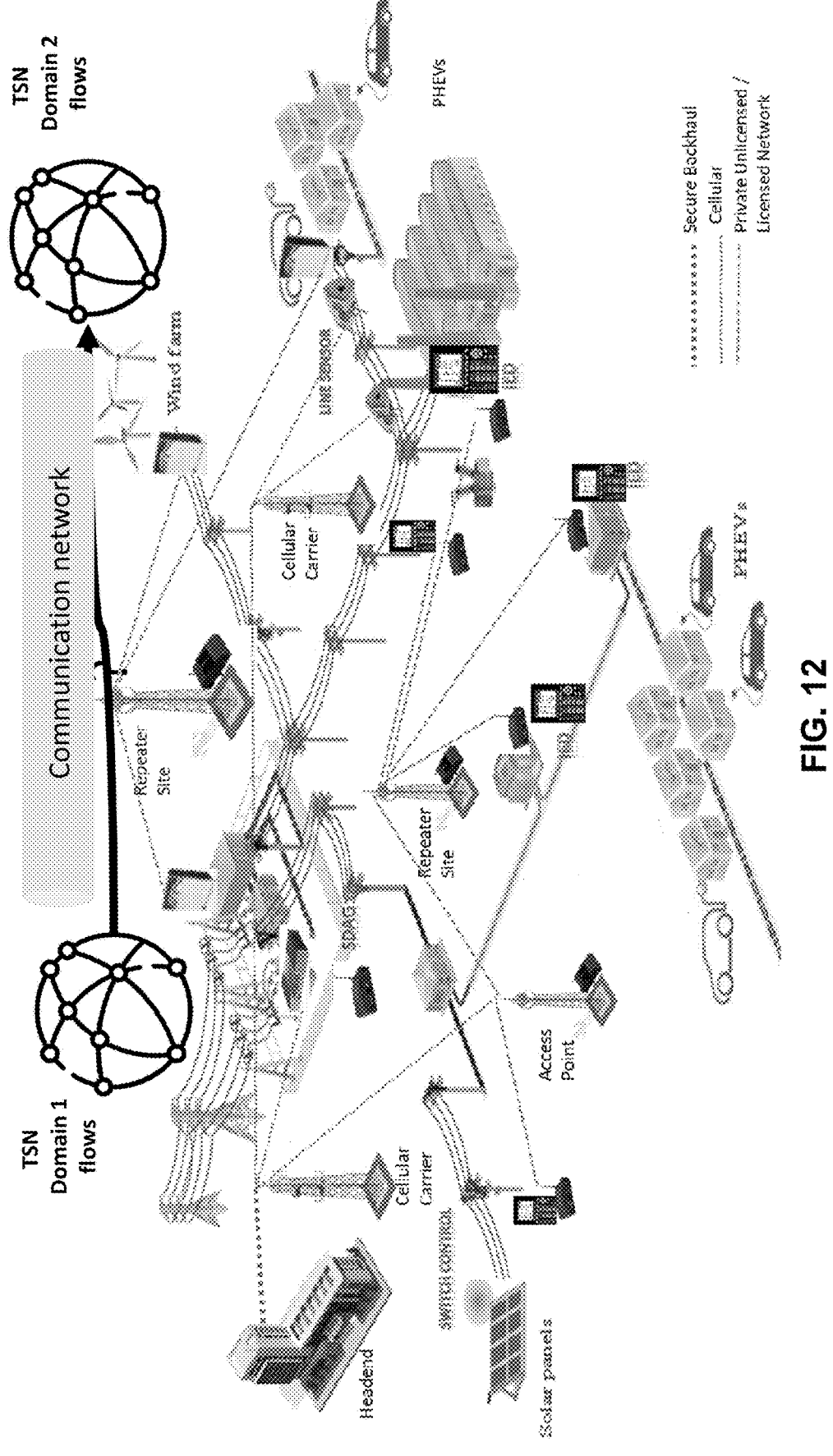
FIG. 12 illustrates an example of a path configured through multiple TSN domains in accordance with one or more implementations.

FIG. 12 illustrates an example of a path configured through multiple TSN domains in accordance with one or more implementations.

In response to the Nash equilibrium that reaches a consensus via the TSN interconnection communication as described in FIG. 11, a path is configured through multiple TSN domains (e.g., TSN domain 1 and TSN domain 2) based a composite TSN schedule. As shown in FIG. 12, the first TSN flow in the TSN domain 1 may be transmitted along the path from the TSN domain 1 to the TSN domain 2.

Figure 13:
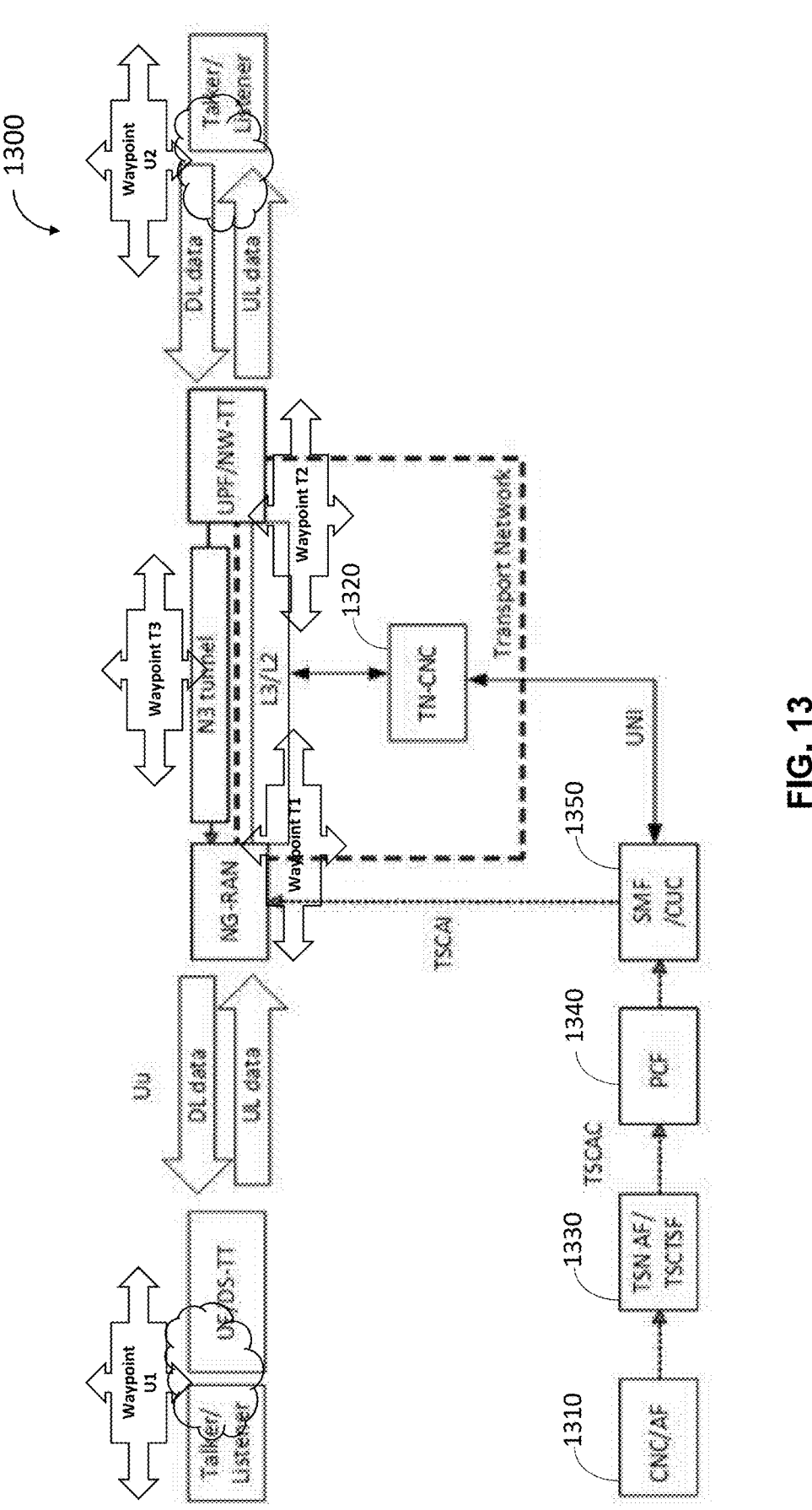
FIG. 13 illustrates an example of an integrated TSN-communication network system.

FIG. 13 illustrates an example of an integrated TSN-communication network system.

In some implementations, an integrated TSN-communication network system 1300 similar to the system 100 and the system 200 is configured to support and manage deterministic TSN data flows between a data source ("source device") and a data destination device ("destination device") via a communication network system (e.g., a wireless network or a network system compatible with 3GPP standards) in accordance with TSN configuration including a TSN schedule. The integrated TSN-communication network system 1300 can be referred to as a system. The integrated TSN-communication network system 1300 may include a CNC/AF 1310 and a Transport Network CNC (TN-CNC) 1320. The CNC/AF 1310 in an external TSN network (e.g., a user network outside a communication network system of the integrated TSN-communication network system 1300) provides bridge configuration to a TSN AF/TSCTSF 1330. The TSN AF/TSCTSF 1330 uses the PSFP information (as specified by IEEE 802.1Qcc) as provided by the CNC/AF 1310 to derive TSC Assistance Container (TSCAC). The TSCAC is provided to a SMF/CUC 1350 via PCF 1340, and the SMF/CUC 1350 determines the TSC Assistance Information (TSCAI) as specified in TS 23.501. TS 23.501 is incorporated by reference herein in its entirety. The TN-CNC 1320 is within the communication network system of the integrated TSN-communication network system 1300 as shown in FIG. 13. The transport network is a dedicated Ethernet and the TN-CNC 1320 is essentially acting as a slave (no negotiation) to the CNC/AF 1310, who acts as a TSN user (e.g., the SMF/CUC 1350). The transport network is carrying I/Q data, which has a different encoding from Ethernet bits and this must be taken into account. In some implementations, CNCs including the CNC/AF 1310 and TN-CNC 1320 are in the same TSN domain or the TN-CNC 1320 is in a separate domain (different operator) from the CNC/AF 1310 or other TN-CNCs and interconnect multiple TSN UPFs 122 to multiple NG-RANs 120 and negotiate for its service (or TSN flows) with the CNC/AF 1310 and/or other TN-CNCs until they reach an agreement to create a composite schedule as explained above. In some implementations, as shown in FIG. 13, the integrated TSN-communication network system 1300 may have one or more waypoints for TSN interconnectivity as explained above. For example, at least one waypoint such as a waypoint U1 and a waypoint U2 may be added in TSN talker and TSN listener network interconnected via a TNS-communication network. Each cloud in FIG. 13 represents a separate Ethernet. At least one other waypoint such as a waypoint T1, a waypoint T2 and a waypoint T3 may be added in TN-CNC domain. The waypoint T3 represents one or more other waypoints which are available to support TSN flows through the TN-CNC domain. The at least one of the waypoint U1 and the waypoint U2 communicates with at least one waypoint in the TN-CNC domain (e.g., the waypoint T1, the waypoint T2, the waypoint T3, etc.) and negotiates with each other.

Waypoints may also be used to allocate TSN flows to support 5G+ network slicing.

Waypoints may also be a component of a zero-touch network and service management or self-organizing network. When integrated with AI/ML services, waypoints may participate in determining TSN configuration and charging with minimal human intervention.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism.

The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A communication network configured to support time-sensitive interconnection communication, comprising:

a plurality of communication network components, each communication network component configured to provide a functionality for data communication from a source device across the communication network to a destination device; and a processor arranged to configure at least one of the plurality of communication network components based on a time sensitive communication schedule of a flow which passes through the at least one of the plurality of communication network components, wherein the at least one of the plurality of communication network components is configured as at least one waypoint to provide the time sensitive interconnection communication such that the at least one waypoint communicates with at least one of other waypoints in a neighbor communication network to connect the time sensitive communication schedule with another time sensitive communication schedule of another flow passing through a plurality of other communication network components in the neighbor communication network.

2. The communication network according to claim 1, wherein the at least one waypoint is an intermediate point along the flow and defines an egress port which the flow passes through so that the flow pass through the at least one of other communication network components in the neighbor communication network.

3. The communication network according to claim 2, wherein the at least one waypoint includes a null waypoint which identifies a location and a time that Ethernet frames egress through a port corresponding to the null waypoint.

4. The communication network according to claim 2, wherein the at least one waypoint includes a splitting waypoint which provides splitting functionality to split the flow so that the split flows transmit over multiple egress ports.

5. The communication network according to claim 2, wherein the at least one waypoint includes a merging waypoint which receives one or more split flows from the at least one of other communication network components in the neighbor communication network.

6. The communication network according to claim 1, wherein the processor generates configuration information for the at least one waypoint, the configuration information including: a stream ID, an ethernet address, cycle time and offset information, a waypoint stream split table, a waypointsplitentry, waypointsplitenabled information, a waypointSplitport, a waypointSplitDirection, a waypointSplitInputIdList, a waypointSplitOutputIdList and Waypoint join.

7. The communication network according to claim 6, wherein the stream ID identifies the flow, the ethernet address represents address of a flow that egress from a network, the cycle time and offset information represents an offset within a cycle time that frames of the flow transmit through the at least one waypoint and the waypoint join is simply identified by the stream ID and an ingress point to a device in the neighbor communication network.

8. The communication network according to claim 7, wherein the waypoint stream split table includes:

the waypointsplitentry is included in the waypoint stream split table and specifies a port and direction on which an instance of splitting function is instantiated, the waypointsplitenabled information represent whether the splitting function is enabled, the waypointSplitInputIdList represents a list of stream_handles (tsnStreamIdHandle values) corresponding to flows that are to be split, the waypointSplitOutputIdList represents a list of stream_handles (tsnStreamIdHandle values) corresponding to the flows into which an input packet is to be split, the waypointSplitport represents a port on which the instance of the splitting function is specified by the waypointSplitInputIdList and the waypointSplitOutputIdList; and the waypointSplitDirection is a Boolean object indicating whether the instance of the splitting function is to be placed on an out-facing or in-facing side of the port indicated by the waypointSplitport.

9. The communication network according to claim 1, wherein the at least one of the plurality of other communication network components is configured as the at least one of other waypoints.

10. The communication network according to claim 9, wherein the time sensitive interconnection communication includes:

sending a transmission window offer for transmitting the flow to the least one other waypoint;

receiving a transmission window counter offer for transmitting the another flow from the least one waypoint; and scoring a sum of a bandwidth of the flow and a bandwidth of the another flow and penalty for jitter and exceeding minimum latency requirements.

11. The communication network according to claim 10, wherein the transmission window offer includes:

cycle time and offset information represents an offset within a cycle time that frames of the flow transmit through the at least one waypoint and open duration.

12. A system configured to support time sensitive interconnection communication, comprising:

a first communication network comprising:

a first processor configured to schedule a first flow within a first domain including one or more first communication network components in the first communication network; and at least one first waypoint, acting as at least one of the one or more first communication network components, configured to provide the time sensitive interconnection communication; and a second communication network comprising:

a second processor configured to schedule a second flow within a second domain including one or more second communication network components in the second communication network; and at least one second waypoint, acting as at least one of the one or more second communication network components, configured to provide the time sensitive interconnection communication, wherein the at least one first waypoint communicates with the at least one second waypoint to create a composite time sensitive communication schedule such that the first flow passes from the first communication network to the second communication network via the time sensitive interconnection communication.

13. The system according to claim 12, wherein: the at least one first waypoint is an intermediate point along the first flow and defines an egress port through which the first flow passes and the at least one second waypoint is an intermediate point along the second flow and defines an egress port through which the second flow passes.

14. The system according to claim 13, wherein the at least one first waypoint includes a null first waypoint which identifies a location and a time that frames egress through a port corresponding to the null first waypoint.

15. The system according to claim 13, wherein the at least one first waypoint includes a splitting first waypoint which provides splitting functionality to split the first flow so that the split first flows transmit over multiple egress ports.

16. The system according to claim 13, wherein the at least one first waypoint includes a merging first waypoint which receives one or more split second flows from the at least one second waypoint in the second communication network.

17. The system of claim 12, wherein configuration information for the at least one first waypoint includes: a stream ID, an ethernet address, cycle time and offset information, a waypoint stream split table, a waypointsplit entry, waypoint-splitenabled information, a waypointSplitport, a waypoint-SplitDirection, a waypointSplitInputIdList, a waypointSplitOutputIdList and a waypoint join.

18. The system according to claim 12, wherein the time sensitive interconnection communication includes:

sending a transmission window offer for transmitting the first flow to the least one second waypoint;

receiving a transmission window counteroffer for transmitting the second flow from the least one second waypoint; and scoring a sum of a bandwidth of the first flow and a bandwidth of the second flow and penalty for jitter and exceeding minimum latency requirements.

19. The system according to claim 12, wherein the first communication network and the second communication network are networks compatible with 3GPP standards.

20. The communication network according to claim 1, wherein the time sensitive communication schedule includes a time sensitive network (TSN) schedule.

* * * * *